United States Patent
Knothe et al.

(10) Patent No.: US 10,178,171 B2
(45) Date of Patent: Jan. 8, 2019

(54) CONTENT MANAGEMENT SYSTEM FOR DISTRIBUTION OF CONTENT

(71) Applicant: Samsung Electronics Company, Ltd., Suwon (KR)

(72) Inventors: Dennis Knothe, Vancouver (CA); Nathan Vick, Burnaby (CA)

(73) Assignee: Samsung Electronics Company, Ltd., Suwon (KR)

( * ) Notice: Subject to any disclaimer, the term of this patent is extended or adjusted under 35 U.S.C. 154(b) by 73 days.

(21) Appl. No.: 15/135,277

(22) Filed: Apr. 21, 2016

(65) Prior Publication Data

US 2017/0310753 A1    Oct. 26, 2017

(51) Int. Cl.
  *H04N 21/21* (2011.01)
  *H04L 29/08* (2006.01)

(52) U.S. Cl.
  CPC .......... *H04L 67/1097* (2013.01); *H04L 67/02* (2013.01); *H04L 67/1091* (2013.01)

(58) Field of Classification Search
  CPC .. H04L 67/1097; H04L 67/02; H04L 67/1091
  See application file for complete search history.

(56) References Cited

U.S. PATENT DOCUMENTS

| | | | |
|---|---|---|---|
| 6,490,610 B1 | 12/2002 | Rizvi | |
| 7,203,778 B2 | 4/2007 | Clark | |
| 7,840,667 B2 | 11/2010 | Weller | |
| 8,200,810 B2 | 6/2012 | Gagliardi | |
| 8,812,695 B2 | 8/2014 | Luna | |
| 8,856,346 B2 | 10/2014 | Wills | |
| 8,892,480 B2 | 11/2014 | Eustice | |
| 8,965,786 B1 | 2/2015 | Frumkin | |
| 2003/0009365 A1 | 1/2003 | Tynan | |
| 2004/0025174 A1 | 2/2004 | Cerrato | |
| 2008/0201453 A1* | 8/2008 | Assenmacher | G06F 11/3664 709/219 |
| 2009/0124241 A1 | 5/2009 | Krishnaswamy | |
| 2010/0235472 A1* | 9/2010 | Sood | H04L 65/4092 709/219 |
| 2011/0088076 A1* | 4/2011 | Li | H04N 7/17318 725/114 |

(Continued)

FOREIGN PATENT DOCUMENTS

EP      2389020 A1    11/2011

*Primary Examiner* — Scott B Christensen
(74) *Attorney, Agent, or Firm* — Baker Botts L.L.P.

(57) ABSTRACT

In one embodiment, a method includes receiving a request from a client device, the request including one or more device dimensions associated with the client device. The method further includes identifying a set of one or more content profiles, where each identified content profile is associated with one or more content-profile dimensions that are compatible with the received device dimensions. The method also includes determining whether a previously created content manifest corresponds to the identified set of content profiles. The method also includes, in response to a determination that a previously created content manifest corresponds to the identified set of content profiles, sending to the client device a uniform resource identifier (URI) identifying a resource that includes the previously created content manifest.

18 Claims, 10 Drawing Sheets

(56) References Cited

U.S. PATENT DOCUMENTS

| | | |
|---|---|---|
| 2011/0179185 A1* | 7/2011 | Wang ................ H04L 65/4084 709/231 |
| 2012/0028614 A1 | 2/2012 | Bertin |
| 2012/0096121 A1 | 4/2012 | Hao |
| 2013/0346589 A1 | 12/2013 | Leshko |
| 2014/0040496 A1* | 2/2014 | Moorthy ............ H04L 65/4084 709/231 |
| 2014/0098850 A1 | 4/2014 | Wolfram |
| 2014/0201615 A1 | 7/2014 | Rajkumar |
| 2014/0215071 A1* | 7/2014 | Lee .................... H04L 47/6275 709/225 |
| 2014/0245359 A1 | 8/2014 | De Foy |
| 2014/0304367 A1 | 10/2014 | Fletcher |
| 2014/0355625 A1* | 12/2014 | Chen ................. H04L 65/4084 370/468 |
| 2015/0095762 A1 | 4/2015 | Rajkumar |
| 2015/0177938 A1 | 6/2015 | Kleinpeter |
| 2015/0199668 A1 | 7/2015 | Fernando |
| 2016/0127260 A1* | 5/2016 | Gordon ................ H04L 47/783 709/226 |
| 2016/0307596 A1* | 10/2016 | Hardin ................... H04L 65/40 |

* cited by examiner

| Content-Item ID | Content Item Name | Codec | Resolution |
|---|---|---|---|
| 1 | christmas.mp4 | H.264 | 1920 × 1080 |
| 2 | background.jpg | JPEG | 640 × 480 |
| 3 | song.mp3 | MP3 | 320 kbit/s |

*FIG. 3*

| Content-Profile ID | Items in Content Profile | Models | Languages | Regions | Time |
|---|---|---|---|---|---|
| 1 | christmas.mp4 (use: screensaver) background.jpg (use:background) | Note5, S6 | en, fr, es | NA-US, NA-CA | 24-Dec-16 0:00 to 27-Dec-16 0:00 |
| 2 | song.mp3 (use:gallery) background.jpg (use:background) | Note5 | all | all | unlimited |

Receive, at a server of a content delivery network (CDN), an updated client-resource file, where the updated client-resource file is an updated version of a current client-resource file identified by a particular uniform resource identifier (URI) of the CDN;

1220

Receive a request a request from a first client device to access the particular URI

1230

Provide to the first client device the updated client-resource file

*FIG. 12*

CONTENT MANAGEMENT SYSTEM FOR DISTRIBUTION OF CONTENT

TECHNICAL FIELD

This disclosure generally relates to digital content management systems and digital content delivery networks.

BACKGROUND

A content management system (CMS) may enable its users to create, upload, or manage various digital content items which may be distributed to client computing devices through a content delivery network (CDN). A CMS may be used for storing or publishing digital content, which may include text documents, applications, images, or multimedia files (e.g., audio or video files). A new or updated content item may be uploaded to a CMS and then sent to an associated CDN for distribution to client computing devices. A client computing device—such as a smartphone, tablet computer, or laptop computer—may connect to the CDN to access a new or updated content item. A CDN may include a network of servers configured to deliver content to client computing devices. A CDN may include anywhere from a few servers to thousands of nodes with tens of thousands of servers distributed over a wide geographic area.

BRIEF DESCRIPTION OF THE DRAWINGS

FIG. 3 illustrates an example content-item table that includes three example content items along with associated dimensions.

FIG. 4 illustrates an example content-profile table that includes two example content profiles along with associated dimensions.

FIG. 12 illustrates an example method for providing an updated client-resource file to a client device.

DESCRIPTION OF EXAMPLE EMBODIMENTS

Figure 1:
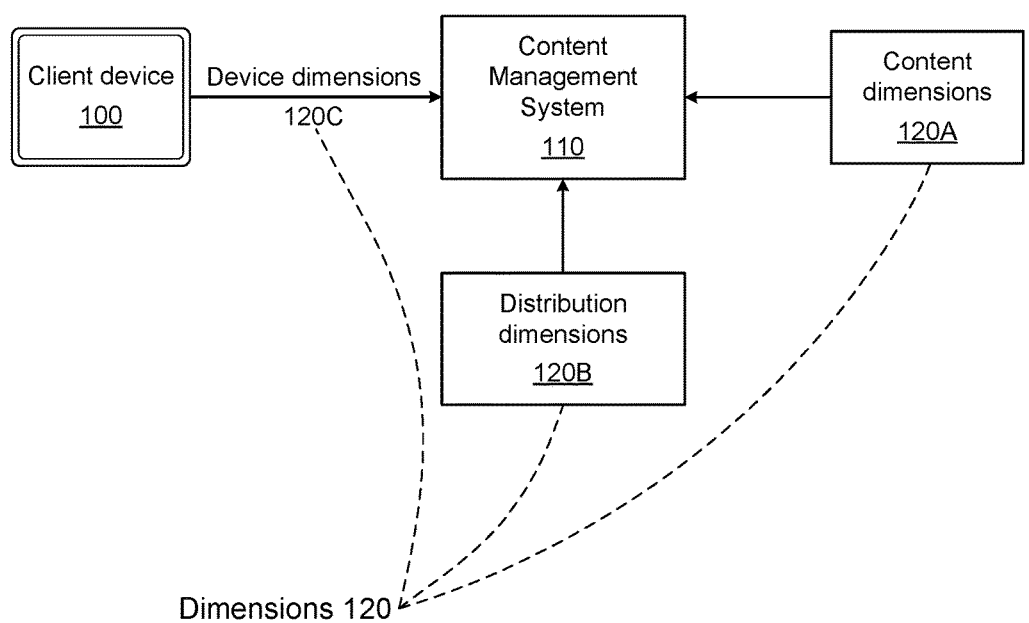
FIG. 1 illustrates an example content management system and a variety of example dimensions.

FIG. 1 illustrates an example content management system 110 and a variety of example dimensions 120. In particular embodiments, a content management system (CMS) 110, which may be referred to as a digital content management system, may be used to support the creation, management, or distribution of digital content items. As an example and not by way of limitation, CMS 110 may manage content items which are distributed to client devices 100. Content items may be distributed directly to client device 100 by CMS 110, or CMS 110 may send content items to a distribution service (e.g., a content delivery network) which handles the distribution of content items to client devices 100. In particular embodiments, content items may include any suitable type of content, such as for example, content related to marketing, advertising, business, news, recreation, entertainment, music, or education. As an example and not by way of limitation, a content item related to marketing may include a screensaver that rotates through a number of images or videos that highlight features of a client device 100. In particular embodiments, a content item (which may be referred to as a digital content item, digital content, content file, content, resource file, or resource) may include a document, file, software application, image, multimedia file, video, audio file, computer-readable file, or command configured to be stored, displayed, operated, or played by a client device 100. As an example and not by way of limitation, a content item may include a product brochure, data sheet, user guide, white paper, presentation, publication, slideshow of images, music, or a podcast. Although this disclosure describes and illustrates particular content items, this disclosure contemplates any suitable content items.

In particular embodiments, a client device 100 (which may be referred to as a computing device, computing system, client system, client, wireless device, or device) may be a personal computer, laptop computer, cellular telephone, smartphone, smartwatch, smart TV, virtual reality headset, e-book reader, mobile computing device, handheld electronic device, tablet computer, camera, Internet of Things (IoT) endpoint device, other suitable electronic device, or any suitable combination thereof. In particular embodiments, a client device 100 may communicate with a CMS 110 or a content delivery network (CDN) through one or more wired or wireless communication links. As an example and not by way of limitation, client device 100 may access a network, the Internet, or a server of a CMS or CDN through one or more wired or wireless communication links. As another example and not by way of limitation, a client device 100 may receive a new or updated content item through a connection with a CMS or CDN that includes a combination of wired and wireless communication links. A wired communication link may include a Digital Subscriber Line (DSL) link or a Data Over Cable Service Interface Specification (DOCSIS) link. A wireless communication link may include a Wi-Fi, BLUETOOTH, Worldwide Interoperability for Microwave Access (WiMAX), cellular, or optical link. Although this disclosure describes and illustrates particular client devices configured to send or receive particular content by particular wired or wireless communication links, this disclosure contemplates any suitable client devices configured to send or receive any suitable content by any suitable wired or wireless communication links.

In particular embodiments, CMS 110 may be used to manage or distribute content to a CDN or a large number of clients 100 along various dimensions 120. As an example and not by way of limitation, CMS 110 may be used to manage and distribute software run by hundreds of devices located in a particular region. As another example and not by way of limitation, CMS 110 may be used to manage and distribute marketing content to hundreds of thousands of client devices 100 located in tens of thousands of stores around the world. In particular embodiments, a content item may be classified or distributed based on a variety of dimensions 120, such as for example, content dimensions 120A, distribution dimensions 120B, or device dimensions 120C, or any other suitable dimension 120 or suitable combination of dimensions 120. As illustrated in FIG. 1, CMS 110 may receive content dimensions 120A, distribution dimensions 120B, and device dimensions 120C. As an example and not by way of limitation, CMS 110 may distribute content items to client device 100 based at least in part on the received content dimensions 120A, distribution dimensions 120B, or device dimensions 120C. As used herein a dimension 120 may refer to a content dimension 120A, a distribution dimension 120B, a device dimension 120C, or any other suitable dimension 120 or suitable combination of dimensions 120.

In particular embodiments, a dimension 120 may refer to a classification or a descriptor that identifies, describes, or characterizes a content item, a client device 100, or how a content item is to be used or distributed. In particular embodiments, content items may be classified based on a variety of dimensions 120 which may correspond to a multi-dimensional matrix that may be used to determine what content should be distributed to which clients 100. As an example and not by way of limitation, one or more users may access CMS 110 to upload content items or dimensions 120 associated with the content items, and the CMS may manage the distribution of the content items to client devices 100 based on the content dimensions 120A as well as distribution dimensions 120B or device dimensions 120C. Although this disclosure describes and illustrates particular dimensions associated with the distribution of particular content items, this disclosure contemplates any suitable dimensions associated with the distribution of any suitable content items.

In particular embodiments, each content item may have an associated set of content dimensions 120A (which may be referred to as content-item dimensions). As an example and not by way of limitation, a content manager (e.g., a user who creates or manages content items through CMS 110) may access CMS 110 and upload one or more content items. Additionally, for each content item, the content manager may specify one or more content dimensions 120A or distribution dimensions 120B associated with the content item. As another example and not by way of limitation, CMS 110 may receive an uploaded content item and automatically determine one or more dimensions 120 for the uploaded content item. A content dimension 120A or a distribution dimension 120B may be used to classify or characterize a content item or how a content item is to be used or distributed.

In particular embodiments, a content dimension 120A for a content item may include a language, file type, resolution, or a codec associated with the content item. In particular embodiments, a content dimension 120A for a content item may include one or more languages supported by the content item. A document that is written in English, French, and Spanish may have an associated language dimension 120 of "en, fr, es" corresponding to the languages English, French, and Spanish, respectively. An audio file that includes music or a video file that includes images may be designated with a language dimension 120 of "all," indicating that the audio or video file may be distributed to any region without any language-based restriction. In particular embodiments, a content dimension 120A for a content item may include a file type (which may be referred to as a file format) that indicates how information is encoded in the content item. File types may include Portable Document Format (PDF), Extensible Markup Language (XML), Hypertext Markup Language (HTML), Joint Photographic Experts Group (JPEG), Portable Network Graphic (PNG), Moving Picture Experts Group (MPEG), Third Generation Partnership Project (3GPP), or any other suitable file type or file format. A user may specify a file type for a content item, or CMS 110 may automatically determine a file type for an uploaded content item based on internal metadata contained within the content item. In particular embodiments, a content dimension 120A for a content item may include a resolution associated with the content item, such as for example, a screen resolution associated with the content item (e.g., 640 pixels×480 pixels) or an audio resolution associated with the content item (e.g., 320 kilobits per second). CMS 110 may automatically analyze an uploaded video file to determine an optimal display size or resolution (e.g., 640 pixels×480 pixels or 1920 pixels×1080 pixels) for playback of the video based on a resolution of the video file. In particular embodiments, a content dimension 120A for a content item may include a codec necessary to support playback of the content item. An audio file may be encoded using MP3 encoding (which may be referred to as MPEG-1 or MPEG-2 encoding), and a client device 100 may require a MP3 codec to playback the audio file. A video file may be encoded using H.264 encoding, and a client device 100 may require a H.264 codec to playback the video file. CMS 110 may determine a codec needed for playback of a music or video file having a particular encoding by analyzing the encoding of the uploaded music or video file. Although this disclosure describes and illustrates particular content items having particular content dimensions, this disclosure contemplates any suitable content items having any suitable content dimensions.

In particular embodiments, the distribution of a content item may be configured along one or more distribution dimensions 120B. As an example and not by way of limitation, a content manager may provide to CMS 110 one or more distribution dimensions 120B associated with one or more content items. A distribution dimension 120B may be used to classify or characterize how a content item is to be used or distributed. In particular embodiments, a distribution dimension 120B for a content item or a group of content items may include a location classification, a usage classification, a time or date classification, or a language. In particular embodiments, a content item may have a location classification that specifies a geographic location or area to which the content item is to be distributed, such as for example a country (e.g., Canada or China), a group of countries (e.g., South America or Eastern Europe), or a region (e.g., northern California, western Canada, or southeast Asia). In particular embodiments, a content item may have a usage classification specifying how the content item is to be used (e.g., as a screensaver; automatically executed upon waking up; or executed when selected by a user). A usage classification may specify whether a content item is to be played automatically (e.g., as a screensaver in a loop) or whether a content item is to be stored on a client device for user consumption. A usage classification may specify one or more device models to which a content item is applicable (e.g., a content item may include a usage classification that specifies distribution to any SAMSUNG GALAXY TAB device). A usage classification may specify a store or company (e.g., a smartphone store or a mobile carrier) to which a content item is applicable. As an example and not by way of limitation, a usage classification may specify that a particular content item is intended for devices located in a BEST BUY retail store or for devices associated with the mobile carrier VERIZON. In particular embodiments, a distribution dimension 120B for a content item may specify a range of times or dates during which the content item should be displayed or used. As an example and not by way of limitation, a content item may include an advertisement for a Mother's Day sale, and the content item may have a date classification specifying display of the content item from one week before Mother's Day to the day after Mother's Day. In particular embodiments, a distribution dimension 120B for a content item may specify one or more languages which the content item is applicable to. As an example and not by way of limitation, a content item may only be distributed to countries or regions where a specified language is applicable. Although this disclosure describes and illustrates particular content items associated with particular distribution dimensions, this disclosure contemplates any suitable content items associated with any suitable distribution dimensions.

In particular embodiments, a client device 100 that receives, stores, or consumes content may be classified according to device dimensions 120C, which may be referred to as client dimensions or client-device dimensions. As an example and not by way of limitation, a client device 100 may provide its device dimensions 120C to CMS 110, and, in response, CMS 110 may provide to the client device 100 a link to one or more content items that are compatible with the device dimensions 120C. In particular embodiments, device dimensions 120C for a client device 100 may include a device model, a display size, a display resolution, a pixel density, a capability of client device 100, a language, a geographic location, a store or company associated with the client device 100, or a file type or codec supported by the client device 100. A device model may refer to a model number or name associated with client device 100, such as for example SAMSUNG GALAXY S6, SAMSUNG GALAXY TAB S2, or SAMSUNG 4K SUED TV. A display size may refer to a length of a diagonal of a display screen of client device 100, such as for example a 5.5-inch, a 9.7-inch, or an 88-inch display size. A display resolution may refer to a number of pixels in a display of client device 100, such as for example a display resolution of 2560 pixels×1440 pixels, 2048 pixels×1536 pixels, or 3840 pixels×2160 pixels. A pixel density may refer to a number of pixels per inch of a display of client device 100, such as for example a pixel density of approximately 534 pixels per inch. A capability of client device 100 may refer to a performance specification of client device 100, such as for example an ability to display videos in high definition, an ability to display three-dimensional videos, a BLUETOOTH capability, an operating system of client device 100, a processor speed, or an amount of available memory. Client device 100 may be configured to operate using a variety of languages which may be specified by a language dimension of the client device 100. As an example and not by way of limitation, client device 100 may be configured to operate using English, French, or Spanish, and the client device 100 may have a corresponding language dimension expressed as "en, fr, es." A geographic location may include an address, city, state, province, country, region, place, latitude-longitude pair, or any other suitable geographic-location identifier that specifies where client device 100 is located. A store or company associated with client device 100 may include a store where client device 100 is located (e.g., BEST BUY) or a carrier (e.g., AT&T, SPRINT, or COMCAST) that provides network access for client device 100. A file type or codec supported by the client device 100 may refer to a file type that client device 100 is capable of displaying or running or a codec that client device 100 is capable of operating. Although this disclosure describes and illustrates particular client devices having particular device dimensions, this disclosure contemplates any suitable client devices having any suitable device dimensions.

Figure 2:
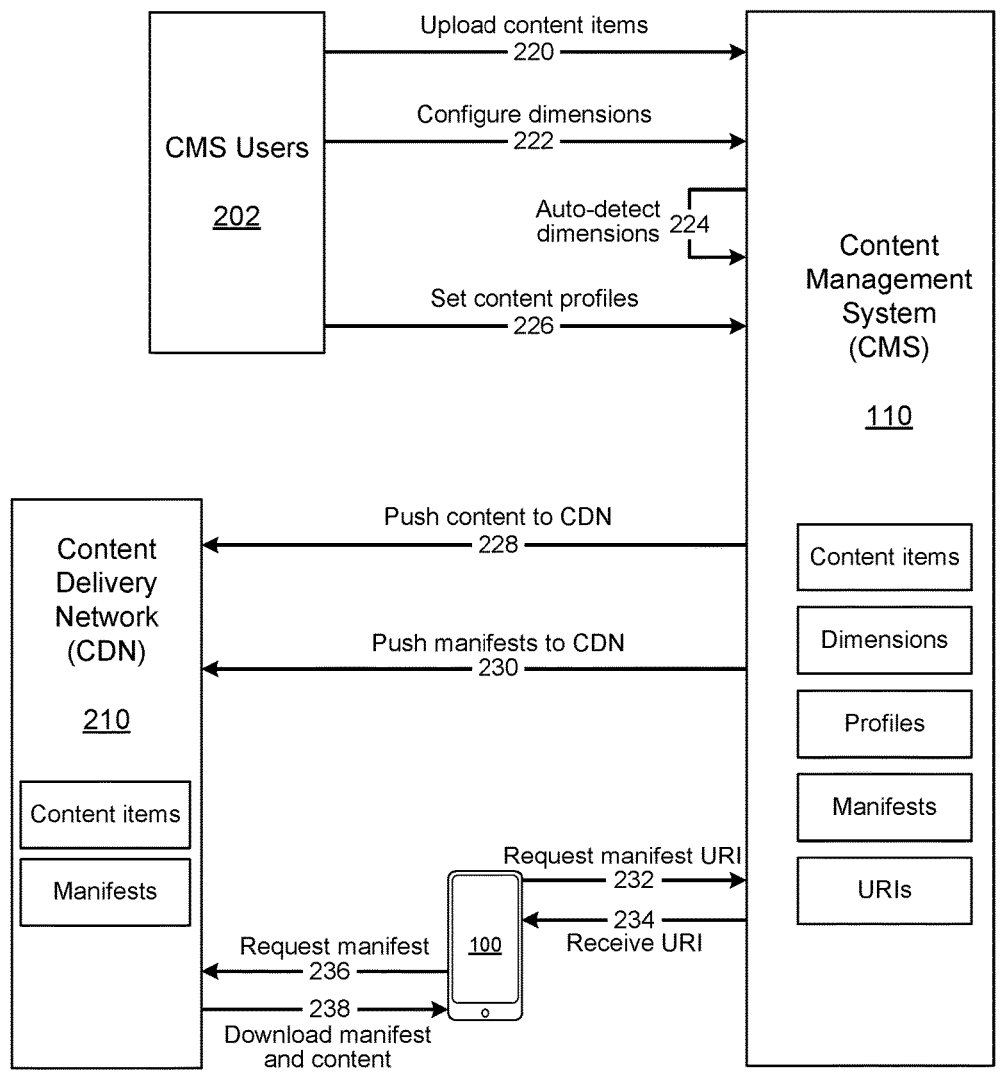
FIG. 2 illustrates an example interaction diagram associated with distribution of content.

FIG. 2 illustrates an example interaction diagram 200 associated with distribution of content. At step 220, a CMS user 202 (e.g., a content manager or a user of CMS 110) may interact with CMS 110 to upload one or more content items, and at step 222, a CMS user 202 may configure dimensions associated with the uploaded content items. As an example and not by way of limitation, a CMS user 202 may specify one or more content dimensions or distribution dimensions for each content item uploaded to CMS 110. As another example and not by way of limitation, a CMS user 202 may upload a video content item called "christmas.mp4" and provide a usage classification that the video is for use as a screensaver on GALAXY NOTE5 devices and GALAXY S6 devices. Additionally, the CMS user 202 may provide a language classification of "en, fr, es" indicating that the video is for distribution to locations compatible with any of the languages English, French, or Spanish. The CMS user 202 may also provide a location classification of "NA-US, NA-CA" indicating that the video is for distribution to the United States and Canada. The CMS user 202 may provide a time and date classification indicating that the video is to be activated or displayed from midnight 24 Dec. 2016 to midnight 27 Dec. 2016.

In particular embodiments, each uploaded content item may be assigned a unique content-item identifier that identifies the content item. As an example and not by way of limitation, CMS 110 or a CMS user 202 may assign a unique identifier to each uploaded content item, and CMS 110 may store the uploaded content items along with identifiers and dimensions associated with the content items. In particular embodiments, a content-item identifier (or, content-item ID) may be a sequential number, a randomly-generated number, a globally unique identifier (GUID) (which may be referred to as a universally unique identifier (UUID)), a hash of a content item or dimensions of the content item, or any other suitable unique key that uniquely identifies a content item. In particular embodiments, a content-item ID may be a number or a sequence of any suitable alphanumeric or other suitable characters. In particular embodiments, a content-item ID may be represented as a decimal number or a binary number, or it may be encoded in hexadecimal form, encoded using base64, or encoded using any suitable hashing operation. Although this disclosure describes and illustrates particular content-item identifiers, this disclosure contemplates any suitable content-item identifiers.

At step 224, CMS 110 may perform an auto-detection process of one or more uploaded content items to determine one or more dimensions associated with the content items. In particular embodiments, CMS 110 may receive a new content item, and CMS 110 may automatically determine one or more content-item dimensions associated with the content item. As an example and not by way of limitation, CMS 110 may analyze an uploaded video content item called "christmas.mp4" and automatically determine that the video requires a H.264 codec to playback the video. Additionally, CMS 110 may determine that the "christmas.mp4" video should be played with a screen resolution of at least 1920 pixels×1080 pixels. As another example and not by way of limitation, CMS 110 may analyze an uploaded audio file called "song.mp3" to determine that the audio file requires a MP3 codec and that the audio file has a resolution of 320 kilobits per second (kbit/s).

At step 226, a CMS user 202 may set or define one or more content profiles. In particular embodiments, a content profile (which may be referred to as a profile, a resource file, or a resource) may include one or more content items that share a set of common or compatible dimensions. As an example and not by way of limitation, a content profile may include a list of content items that are each intended for distribution to a set of particular client devices 100 or to a particular geographic location. A content profile may include a list of one or more content-item identifiers, where each content-item identifier is a unique identifier that corresponds to a content item that is part of the content profile. A CMS user 202 may configure a content profile that includes one or more content items, and the user 202 may define one or more content-profile dimensions associated with the content profile. A content-profile dimension for a content profile may refer to a dimension that classifies or characterizes the collective content items of the content profile. As an example and not by way of limitation, the content-profile dimensions for a particular content profile may include a combination of the dimensions of the content items that are part of the content profile. The content-profile dimensions for a content profile may dictate how the content items of the content profile are distributed.

In particular embodiments, a dimension (e.g., a content dimension, a distribution dimension, or a content-profile dimension) may be a single-level dimension or may be a hierarchical dimension that includes two or more levels. As an example and not by way of limitation, a single-level location classification may include a reference to a single geographic location (e.g., Canada), while a hierarchical location classification may include references to multiple geographic locations (e.g., Canada, British Columbia, and Vancouver), where larger geographic areas may contain smaller geographic areas. As another example and not by way of limitation, a hierarchical device-model dimension may include a list of specific model numbers that work with various cell standards or frequencies or that have various memory capacities.

In particular embodiments, a CMS user 202 may create a variant of an existing content profile. As an example and not by way of limitation, an existing content profile may be copied to a new content profile, and a CMS user 202 may edit the new content profile to define a content profile with content items or dimensions that are different or modified with respect to the original content profile. When a new version of a content profile is created, whether by editing an existing version or by publishing an edited version, a new content-profile identifier may be assigned, so as to distinguish it from previous versions of the content profile. In particular embodiments, a content-profile identifier (or, content-profile ID) may be a sequential number, a randomly-generated number, a GUID, a hash of the content or dimensions of a content profile, or any other suitable unique key that uniquely identifies a content profile or a version of a content profile. In particular embodiments, a content-profile ID may be a number or a sequence of any suitable alphanumeric or other suitable characters. In particular embodiments, a content-profile ID may be represented as a decimal number or a binary number, or it may be encoded in hexadecimal form, encoded using base64, or encoded using any suitable hashing operation. In particular embodiments, a content-profile ID may be generated by CMS 110, CDN 210, or by a CMS user 202. Although this disclosure describes and illustrates particular content-profile identifiers, this disclosure contemplates any suitable content-profile identifiers.

In particular embodiments, a CMS 110 may receive one or more content profiles, and each content profile may be assigned a unique content-profile identifier that identifies the content profile. As an example and not by way of limitation, CMS 110 may generate or assign a unique content-profile identifier to each content profile, and CMS 110 may store the content profile along with the dimensions and content items associated with the content profile. In particular embodiments, content-profile dimensions associated with a content profile may include a language supported by the content profile, a geographic location where the content profile applies, a device dimension supported by the content profile, a file type or codec associated with the content profile, how a content item of the content profile is to be used, a time or date restriction for the content profile, or a store or company associated with the content profile. As an example and not by way of limitation, a content profile may include two or more content items, and a content-profile dimension may specify that the content items are intended for use or display during a particular range of dates (e.g., from 1 Jul. 2017 to 7 Jul. 2017). As another example and not by way of limitation, a content profile may include two or more content items, and a content-profile dimension of the content profile may specify that the content items are for use in all regions (e.g., worldwide), for all languages, and for an unlimited period of time.

At step 228, CMS 110 may send one or more content items to CDN 210 for storage and distribution so that the content items can be made available to client devices 100 by CDN 210. As an example and not by way of limitation, CMS 110 may send one or more content items and their respective content-item identifiers to CDN 210 by a server push. As another example and not by way of limitation, CDN 210 may obtain one or more content items from CMS 110 by a pull operation in which CDN 210 pulls the content items from CMS 110. In response to receiving a content item from CMS 110, the CDN 210 may store the content item and assign a uniform resource identifier (URI) to the content item. The URI may include a string of characters that identify a resource of the CDN 210 corresponding to the content item. As an example and not by way of limitation, the URI may be a uniform resource locator (URL) or web address of a web location of the CDN 210 that includes the content item, and a client device 100 may access the web location to download a copy of the content item. In particular embodiments, a web location may be referred to as a web site or a web page. The CDN 210 may send the URI for a content item to the CMS 110, and the CMS may store the URI and provide the URI to one or more client devices 100 so that the client devices 100 can download the content item from the CDN 210. In particular embodiments, CDN 210 may be referred to as a digital content delivery network, a digital content distribution network, a content delivery network or a content distribution network.

At step 230, CMS 110 may send one or more content manifests to CDN 210 for storage and distribution by the CDN 210. As an example and not by way of limitation, CMS 110 may send one or more content manifests to CDN 210 by a server push. As another example and not by way of limitation, CDN 210 may obtain one or more content manifests from CMS 110 by a pull operation. In particular embodiments, a content manifest (which may be referred to as a manifest, a resource file, or a resource) may include one or more content-item entries corresponding to one or more respective content items. As an example and not by way of limitation, each entry of a content manifest may correspond to a particular content item and may include a content-item identifier associated with the content item, a URI associated with the content item, a hash value associated with the content item, or one or more dimensions associated with the content item. As another example and not by way of limitation, a manifest may include a listing of one or more URIs, where each URI corresponds to a web location of the CDN 210 containing a particular content item. In response to receiving a content manifest from CMS 110, the CDN 210 may store the content manifest at a location having a particular URI. The CDN 210 may send the URI for the content manifest to the CMS 110. The CMS may store the manifest URI and provide the manifest URI to a client device 100 so that the client device 100 can download the content manifest from the CDN 210.

In particular embodiments, CMS 110 may send a message (e.g., a push notification) to affected client devices 100 to notify them that a new content manifest is available. As an example and not by way of limitation, CMS 110 may send a push notification to a client device 100 whose device dimensions have already been registered with the CMS 110. As another example and not by way of limitation, if a new content profile (or a new version of an existing content profile) is published or if a new or updated content manifest is published, CMS 110 may determine which client devices 100 (e.g., client devices that have previously registered with the CMS) are affected by the new or updated resource, and CMS 110 may send a notification to these client devices 100 that they should download the new or updated resource. As another example and not by way of limitation, when a new content profile (or an updated version of an existing content profile) is published, CMS 110 may send a push notification to affected client devices 100 to notify them that their manifest URI has changed. In particular embodiments, sending a push notification to affected client devices 100 when there is a change in their manifest URI may allow client devices 100 to receive new content relatively quickly (e.g., within seconds or minutes of the content being published). In particular embodiments, the payload of a push notification may include a new manifest URI, which may eliminate the need for a client device 100 to request the new manifest URL from the CMS 110 and may eliminate or reduce the corresponding load on the CMS server.

At step 232, client device 100 may request a manifest URI from CMS 110. In particular embodiments, requesting a manifest URI (e.g., as illustrated by step 232 in FIG. 2) may include client device 100 sending a message to CMS 110 to request a manifest URI or may include client device 100 registering with CMS 110 to receive push notifications. As an example and not by way of limitation, at step 232, if client device 100 registers with CMS 110 to receive push notifications, CMS 110 may send a push notification to client device 100 when there is a new or updated content manifest available for client device 100. This disclosure contemplates that step 232 may additionally or alternatively include client device 100 requesting a manifest URI or registering for push notifications. In particular embodiments, upon receiving a request for a manifest URI from client device 100, CMS 110 may generate a content manifest at this point if a suitable manifest has not already been generated. As an example and not by way of limitation, CMS 110 may employ a lazy or just-in-time manifest-generation process in which only manifests that are actually used by client devices will be generated. In particular embodiments, CMS 110 may generate all possible content manifests whenever a new content profile (or a new version of a content profile) is defined or published. As an example and not by way of limitation, CMS 110 may employ an eager-generation process in which content manifests may be generated for the intersection of every member of every dimension (e.g., the cross join or Cartesian product of the dimensions) without waiting to see if the manifests will be required by actual devices.

In particular embodiments, CMS 110 may receive a request from a client device 100 for a URI or location of a content manifest, and the request may include one or more dimensions associated with the client device 100. As an example and not by way of limitation, client device 100 may send one or more device dimensions associated with the client device 100 to CMS 110 to receive a location or URI of a content manifest that tells the client device 100 what content items to download from CDN 210. Based on the device dimensions provided by client device 100, the CMS 110 may identify a content manifest that is applicable to the client device 100 (e.g., the content manifest refers to content items having dimensions that are compatible with the device dimensions of client device 100).

At step 234, CMS 110 may send a URI associated with the identified content manifest to the client device. In particular embodiments, the URI may be sent in response to a request from client device 100 for a manifest URI, or the URI may be sent to client device 100 as a push notification (e.g., in response to CMS 110 receiving or generating a new or updated content manifest). The URI may correspond to a web location of CDN 210 from which the content manifest may be downloaded. At step 236, client device 100 may request from CDN 210 a manifest corresponding to the URI received from CMS 110. At step 238, client device 100 may download from CDN 210 the manifest and one or more content items listed in the manifest. As an example and not by way of limitation, the client device 100 may download the manifest located at the URI provided by CMS 110. Then, the client device 100 may parse the manifest and download one or more content items listed in the manifest.

Particular embodiments may repeat one or more steps of the interaction diagram of FIG. 2, where appropriate. Although this disclosure describes and illustrates particular steps of the interaction diagram of FIG. 2 as occurring in a particular order, this disclosure contemplates any suitable steps of the interaction diagram of FIG. 2 occurring in any suitable order. Moreover, although this disclosure describes and illustrates an example interaction diagram associated with distribution of content including the particular steps of the interaction diagram of FIG. 2, this disclosure contemplates any suitable interaction diagram associated with distribution of content including any suitable steps, which may include all, some, or none of the steps of the interaction diagram of FIG. 2, where appropriate. Furthermore, although this disclosure describes and illustrates particular components, devices, or systems carrying out particular steps of the interaction diagram of FIG. 2, this disclosure contemplates any suitable combination of any suitable components, devices, or systems carrying out any suitable steps of the interaction diagram of FIG. 2.

FIG. 3 illustrates an example content-item table that includes three example content items along with associated dimensions. In particular embodiments, a content-item table similar to the table illustrated in FIG. 3 may be produced or stored by CMS 110 to track content items and their associated dimensions. In particular embodiments, each content item may be assigned a unique content-item identifier, which may be referred to as a content-item ID. In FIG. 3, the three listed content items have content-item IDs of 1, 2, and 3, respectively. In particular embodiments, each content item may have an associated content-item name. Content items 1, 2, and 3 in FIG. 3 have content-item names "christmas.mp4," "background.jpg," and "song.mp3," respectively. In particular embodiments, a content-item table may include one or more dimensions supplied by a CMS user 202 or one or more dimensions automatically determined by CMS 110. A content-item table may include entries corresponding to 1, 2, 5, 10, 100, 1,000, or any suitable number of content items. Additionally, a content-item table may include 1, 2, 5, 10, 100, 1,000, or any suitable number of columns corresponding to dimensions associated with each content item. A content-item table may include a variety of dimensions, such as for example, a language, file type, resolution, location, usage type, or codec associated with each content item. The table in FIG. 3 includes two columns corresponding to the two dimensions "codec" and "resolution." The codec dimension indicates a codec necessary to support display or playback of the content item, and the resolution dimension indicates a resolution for display or playback of the content item. In FIG. 3, content item 1 is a video file that requires a H.264 codec for playback of the video and a screen resolution of at least 1920 pixels×1080 pixels. Content item 2 is an image file that requires a JPEG codec to display the image and a screen resolution of at least 640 pixels×480 pixels. Content item 3 is an audio file that requires a MP3 codec for playback and that has a resolution of 320 kbit/s. Although this disclosure describes and illustrates particular content items with particular associated dimensions, this disclosure contemplates any suitable content items with any suitable associated dimensions.

FIG. 4 illustrates an example content-profile table that includes two example content profiles along with associated dimensions. In particular embodiments, a content profile may refer to a set of content items that is intended for distribution to particular client devices 100 based on a set of common content-profile dimensions. In particular embodiments, various content profiles and associated dimensions may be defined by CMS users 202, and a corresponding content-profile table similar to the table illustrated in FIG. 4 may be produced or stored by CMS 110 to track content profiles and their associated dimensions. A content-profile table may include entries corresponding to 1, 2, 5, 10, 100, 1,000, or any suitable number of content profiles. Additionally, a content-profile table may include 1, 2, 5, 10, 100, 1,000, or any suitable number of columns corresponding to dimensions associated with each content profile. In FIG. 4, content profile 1 includes two content items, "christmas.mp4" and "background.jpg." The content-profile dimensions for content profile 1 indicate that this content profile is for use on GALAXY NOTE5 and GALAXY S6 devices; for distribution to places compatible with any of the languages English, French, or Spanish; for distribution to the United States and Canada; and for use from midnight 24 Dec. 2016 to midnight 27 Dec. 2016. In FIG. 4, content profile 2 includes two content items, "song.mp3" and "background.jpg." The content-profile dimensions for content profile 2 indicate that this content profile is for use on GALAXY NOTE5 devices; for distribution to all regions with no language-based restrictions; and for unlimited use (e.g., for use indefinitely without a termination date or time). In particular embodiments, each content item within a content profile may also include one or more additional dimensions specifying how the content item is to be used. As an example and not by way of limitation, the "christmas.mp4" content item of content profile 1 includes a usage classification that the video is for use as a screensaver, and the "background.jpg" content item includes a usage classification that the image is for use as a background image. Although this disclosure describes and illustrates particular content profiles with particular associated dimensions, this disclosure contemplates any suitable content profiles with any suitable associated dimensions.

Figure 5:
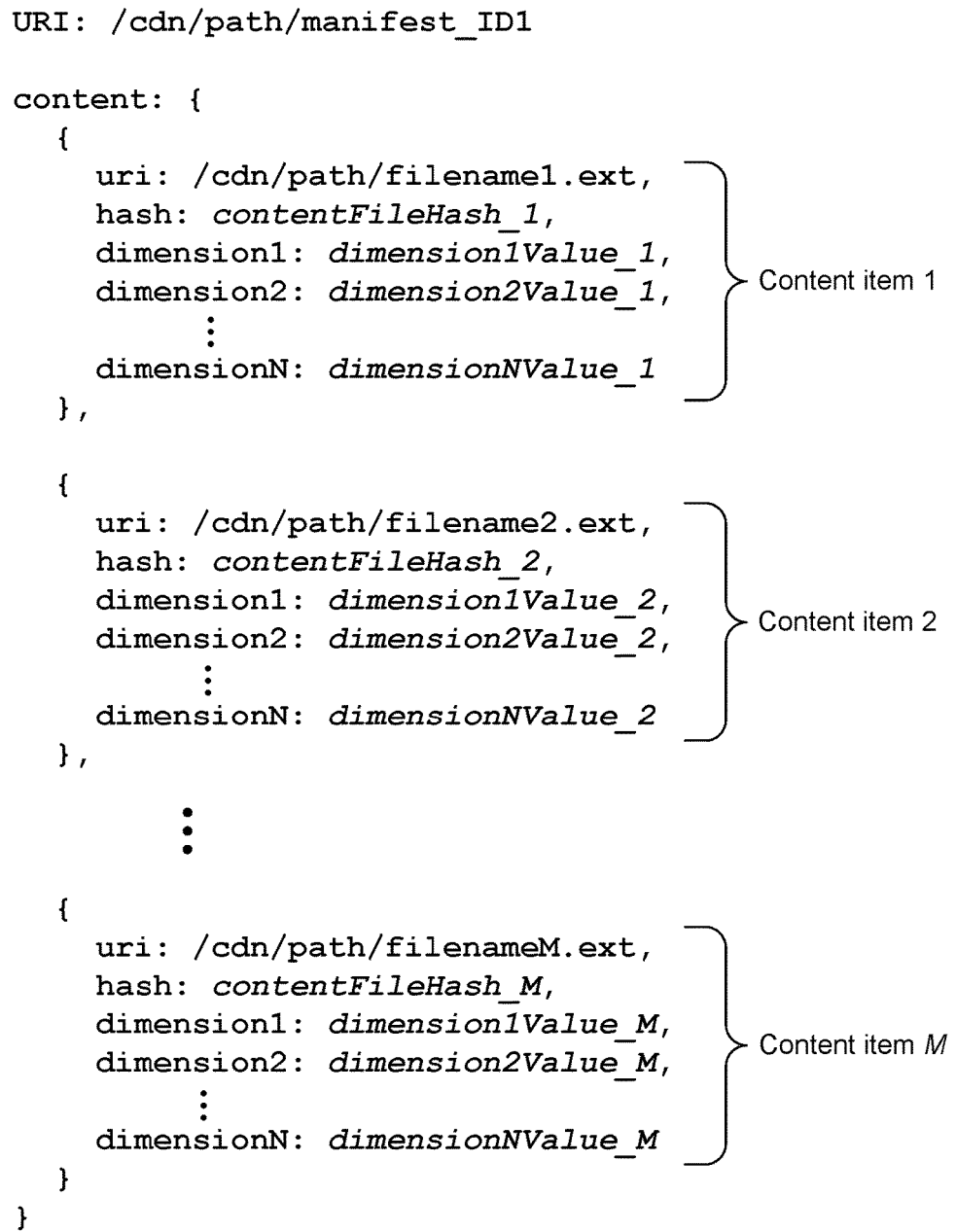
FIG. 5 illustrates an example content manifest.

FIG. 5 illustrates an example content manifest. In particular embodiments, a client device 100 may contact CMS 110 with its device dimensions (e.g., model, location, language) to request a URI for a content manifest stored on CDN 210 that tells the client device 100 what content items to download. In particular embodiments, a content manifest may include a list of content items that correspond to a set of content profiles that have one or more common dimensions. As an example and not by way of limitation, a content manifest may include content items obtained by merging two or more content profiles, where the merged content profiles have one or more common or compatible content dimensions or distribution dimensions. In particular embodiments, a content manifest may be encoded or stored in any suitable format, such as for example, as a text file (as illustrated in FIG. 5) or as an array. In particular embodiments, a content manifest may have a globally unique URI that a client device 100 can use to access the manifest. In the example of FIG. 5, the content manifest has the URI /cdn/path/manifest_ID1 which corresponds to a resource of CDN 210 where the content manifest is located.

In particular embodiments, a content manifest may include one or more content-item entries, where each entry corresponds to a particular content item. In the example of FIG. 5, the content manifest includes M entries corresponding to content items 1 through M. In particular embodiments, each content-item entry in a manifest may include a content-item identifier for the content item, a URI for the content item, a hash value for the content item, or one or more dimensions associated with the content item. In FIG. 5, the entry for content item 1 includes the URI /cdn/path/filename1.ext which indicates a resource of the CDN 210 from which client device 100 can download content item 1. The entry for content item 1 also includes N dimensions which represent dimensions (e.g., language, file type, resolution, codec, location, usage, time, or date) associated with content item 1. Each dimension has an associated dimension value. As an example and not by way of limitation, dimension1 in FIG. 5 may correspond to a language dimension, and dimension1Value_1 may be "en, fr, es," indicating that content item 1 is compatible with the languages English, French, and Spanish. As another example and not by way of limitation, dimension2 in FIG. 5 may correspond to a store dimension, and dimension1Value_2 may be "BEST BUY" indicating that content item 1 is intended for client devices 100 located in BEST BUY retail stores. In particular embodiments, after downloading a content manifest from CDN 210, client device 100 may parse the content-item dimensions in the content manifest to determine how or when to use the associated content item.

In particular embodiments, a content manifest may include two or more content-item entries that have one or more associated dimension values that are different. As an example and not by way of limitation, a first content item in a content manifest may include the following dimensions: store=BEST BUY; location=United States; and model=GALAXY S6. A second content item in the content manifest may include the following dimensions: store=BEST BUY; location=United States; and model=GALAXY S7. The two content items have the same values for the store and location dimensions, but they have different values for the model dimension. The first content item is intended for GALAXY S6 devices, and the second content item is intended for GALAXY S7 devices. A client device 100 that parses the content manifest to determine which content items to download may select one of the two content items (and disregard the other content item) based on whether the device is a GALAXY S6 or GALAXY S7 device. In particular embodiments, a content manifest may include content items that are intended for global distribution along with other content items that are only intended for local distribution. As an example and not by way of limitation, a content manifest may include a reference to an image file that is intended for global distribution to all GALAXY S6 client devices 100 regardless of location. Additionally, the content manifest may also include a reference to a screensaver content item that is intended for distribution to GALAXY S6 client devices 100 only within a particular geographic region (e.g., Canada). In particular embodiments, a content manifest may include one or more dimensions that are configured to be handled or implemented by a client device 100. Some logic of parsing the dimensions of a content manifest and determining the applicability of a particular content item may be performed by a client device 100. As an example and not by way of limitation, a content-item entry for a particular content item may include a dimension with a time or date restriction, such as for example, "date=10 Feb. 2017 to 15 Feb. 2017." A client device 100 may download the associated content item ahead of time, and the client device 100 may store the content item and only use or activate the content item during the range of dates specified by the date restriction.

In particular embodiments, each content-item entry in a manifest may include a hash value associated with the content item. In FIG. 5, the entry for content item 1 includes the hash contentFileHash_1, which is a hash value corresponding to content item 1. In particular embodiments, a hash value for a particular content item may be obtained by applying a hash function that maps particular data from the content item to a unique hash value. As an example and not by way of limitation, a hash function may be applied to a content item's identifier to produce a hash value for the content item. In particular embodiments, a content-item hash value can be used to locate or identify a particular content item. As an example and not by way of limitation, a client device 100 can compare a hash value for a content item it has already downloaded to a hash value for a possibly revised content item. If the two hash values match, then the client device 100 already has the current content item and does not need to download it again. Otherwise, if the hash values do not match, then this indicates that the client device 100 should download the revised content item. Although this disclosure describes and illustrates particular content manifests that include particular data or information, this disclosure contemplates any suitable content manifests that include any suitable data or information.

Figure 6:
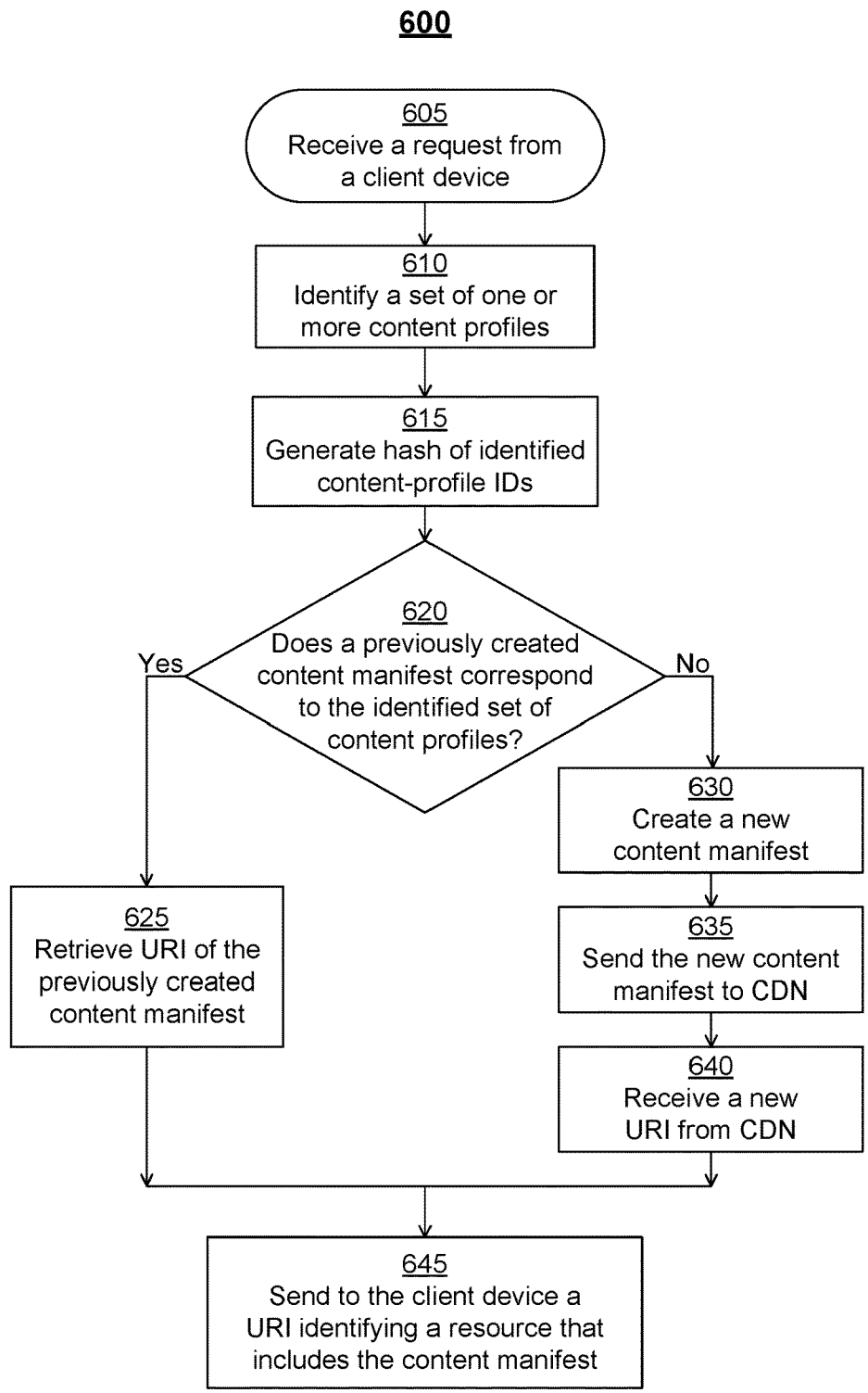
FIG. 6 illustrates an example method for determining which content manifest to send to a client device.

FIG. 6 illustrates an example method 600 for determining which content manifest to send to a client device 100. The method may begin at step 605, where a request is received from a client device 100. In particular embodiments, a CMS 110 may receive a request from a client device 100 for a URI or location of a content manifest, and the request may include one or more device dimensions associated with the client device 100. As an example and not by way of limitation, the device dimensions provided by the client device 100 may include a device model, a display size, a display resolution, a pixel density, a capability, a language, a geographic location, a store or company associated with the client device 100, or a file type or codec supported by the client device 100. As another example and not by way of limitation, a client device 100 may submit to CMS 110 a request for a content manifest, where the request includes the following dimensions: model=GALAXY VIEW; display size=18.4 inches; location=Canada; and store=THE SOURCE.

At step 610, a set of one or more content profiles may be identified. In particular embodiments, in response to receiving device dimensions from a client device 100, CMS 110 may identify a set of one or more content profiles, where each identified content profile is associated with one or more content-profile dimensions that are compatible with the received device dimensions. As an example and not by way of limitation, each content-profile dimension from each identified content profile may be compatible with every received device dimension. As another example and not by way of limitation, CMS 110 may identify a content profile with content-profile dimensions that are relevant to, applicable to, or that match the device dimensions of the client device 100. In particular embodiments, content-profile dimensions associated with a content profile may include a language supported by the content profile, a geographic location where the content profile applies, a device dimension supported by the content profile, a file type or codec associated with the content-profile, how a content item of the content profile is to be used, a time or date restriction for the content profile, or a store or company associated with the content profile. As an example and not by way of limitation, a content profile that includes content items for use as marketing material at the retail stores BEST BUY and THE SOURCE located in the United States and Canada around the time of Mother's Day may include the following content-profile dimensions: store=BEST BUY and THE SOURCE; location=United States and Canada; date=2 May 2016 through 9 May 2016. In particular embodiments, each content profile may include one or more content-item identifiers, where each content-item identifier is a unique identifier that identifies a particular content item associated with the content profile.

In particular embodiments, the content-profile dimensions of each identified content profile being compatible with the received device dimensions may refer to each device dimension matching or being included in a corresponding content-profile dimension. As an example and not by way of limitation, a client device 100 may have device dimensions that include the following: model=GALAXY S6; language=French; location=France. A content profile that is compatible with these device dimensions may have the following content-profile dimensions: model=GALAXY S5 or GALAXY S6; language=English, French, German, Italian, or Spanish; location=Europe. Since the model, language, and location specified by the device dimensions are included in the corresponding content-profile dimensions, there is a match between the device dimensions and the content profile, indicating that the content items of the content profile can be executed or displayed by the client device 100. Another content profile that is compatible with the above device dimensions may have the following content-profile dimensions: model=GALAXY S5 or GALAXY S6; language=all; location=all. In contrast, a content profile that is not compatible with the above device dimensions may have the following content-profile dimensions: model=GALAXY S5 or GALAXY S6; language=English or French; location=Canada. Although the corresponding model and language dimensions are compatible with the above device dimensions, the device location of France is not compatible with the content-profile location of Canada.

At step 615, a hash of identified content-profile IDs may be generated. In particular embodiments, the unique content-profile IDs for each of the identified content profiles may be combined together using a hash function that produces a single, unique hash value representing the set of identified content profiles that are compatible with the received device dimensions. As an example and not by way of limitation, based on the device dimensions received from a client device 100, CMS 110 may identify content profiles that are applicable to the client device 100 and may combine the corresponding content-profile IDs into a single hash value.

At step 620, CMS 110 may determine whether a previously created content manifest corresponds to the identified set of content profiles. As an example and not by way of limitation, CMS 110 may search through its store of content manifests to determine whether there is a content manifest that matches the identified set of content profiles. If there is a previously created content manifest that matches the identified set of content profiles, the method may proceed to step 625. Otherwise, if there is no content manifest matching the identified set of content profiles, the method may proceed to step 630. In particular embodiments, determining whether a previously created content manifest corresponds to the identified set of content profiles may include comparing a content-manifest hash value of the previously created content manifest to a hash value associated with the set of content profiles. As an example and not by way of limitation, CMS 110 may generate a hash of content-profile identifiers of the set of identified content profiles (e.g., the hash value from step 615) and compare it to a content-manifest hash value that is based on a hash of content-profile identifiers associated with the content manifest. As another example and not by way of limitation, CMS 110 may generate a hash of content-item identifiers associated with the set of identified content profiles and compare it to a content-manifest hash value that is based on a hash of content-item identifiers associated with the content manifest. If there is a match between a content-manifest hash value and a hash value of the set of content profiles, then this may indicate that the corresponding content manifest includes the same content items or content profiles as the set of identified content profiles.

In particular embodiments, multiple devices 100 with similar dimension values may request a manifest at approximately the same time. If this happens, there may be an inherent race condition, where the operating-system processes or threads that are handling each request may compete to create a new manifest and send it to the CDN 210. If each new version of a content profile receives a new content-profile ID, then CMS 110 may be implemented such that it can handle an inherent race condition while minimizing or eliminating the locking or blocking of the other processes. As an example and not by way of limitation, the CMS 110 may safely allow each competing process/thread to overwrite a new manifest because the content written from each process/thread will be identical. This is possible because different content would have resulted in different content profile IDs, which would have resulted in a different hash of identified content profile IDs. This may result in an efficient and scalable system because competing processes/threads do not have to lock or block each other from proceeding while the other is writing a new manifest file (e.g., each write request can be queued, such that many processes/threads can attempt to write at the same time).

At step 625, in response to a determination that a previously created content manifest corresponds to the identified set of content profiles, CMS 110 may retrieve a URI of the previously created content manifest. In particular embodiments, the URI of the previously created content manifest may be a URI identifying a resource that includes the previously created content manifest. As an example and not by way of limitation, the URI identifying the resource that includes the previously created content manifest may correspond to a web location of a CDN 210 that includes the previously created content manifest. After retrieving the URI, the method may proceed to step 645.

At step 630, in response to a determination that a content manifest corresponding to the identified set of content profiles has not been created previously, a new content manifest may be created. The CMS 110 may create a new content manifest, which corresponds to the set of identified content profiles that are compatible with the received device dimensions. As an example and not by way of limitation, the new content manifest may be created by merging together the identified content profiles. The content items of the identified content profiles may be combined together and any duplicate content items may be removed from the manifest to eliminate the occurrence of redundant content items. In particular embodiments, CMS 110 may generate a hash value for a newly created content manifest, where the content-manifest hash value may be used to identify the new content manifest or to compare it to other hash values (e.g., a hash value associated with a different set of content profiles). At step 635, the new content manifest may be sent to CDN 210. The CMS 110 may send the new content manifest to CDN 210 for storage and distribution by the CDN 210. At step 640, a new URI may be received from the CDN 210. The CMS 110 may receive a new URI from CDN 210 identifying a resource of the CDN 210 that includes the new content manifest, at which point the method may proceed to step 645. In particular embodiments, CMS 110 or CDN 210 may determine or specify a new URI identifying a location of CDN 210 from which a new or updated resource may be accessed by client devices 100. As an example and not by way of limitation, CMS 110 may send a new or updated content manifest to CDN 210, and CMS 110 may receive from CDN 210 a new URI identifying a resource of the CDN 210 that includes the content manifest. As another example and not by way of limitation, CMS 110 may send a new or updated content manifest to CDN 210, and CMS 110 may also send to CDN 210 a new URI specifying a resource of the CDN 210 from which the content manifest should be made available to client devices 100.

At step 645, a URI identifying a resource of CDN 210 that includes the content manifest may be sent to the client device 100, at which point the method may end. If there is a previously created content manifest matching the identified set of content profiles, the CMS 110 may send to the client device 110 the URI for the previously created content manifest. Otherwise, if there is no previously created content manifest matching the identified set of content profiles, the CMS 110 may send to the client device 110 the new URI for the newly created content manifest.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining which content manifest to send to a client device 100 including the particular steps of the method of FIG. 6, this disclosure contemplates any suitable method for determining which content manifest to send to a client device 100 including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

In particular embodiments, a method for determining a content manifest to send to a client device 100, as described and illustrated herein, may result in a particular content manifest being sent to multiple client devices 100. As an example and not by way of limitation, if a group of two or more client devices 100 have device dimensions that are the same or similar, they may be provided with the same content manifest. In particular embodiments, the number of content manifests created by CMS 110 may be greater than one and less than the total number of client devices 100. As an example and not by way of limitation, a CMS 110 that manages content for approximately one million client devices may create approximately 10,000 to 100,000 separate content manifests for providing content to the client devices. As another example and not by way of limitation, one content manifest may be shared or used by approximately one to 1,000 separate client devices. In particular embodiments, a method for determining a content manifest to send to a client device, as described and illustrated herein, may be applied to a set of client devices that include a limited number of associated device dimensions. As an example and not by way of limitation, a set of client devices that obtain content from a CMS 110 may include client devices having approximately 1 to 100 distinct model numbers, approximately 1 to 10,000 distinct geographic locations, or approximately 1 to 1,000 distinct stores or companies associated with the client devices 100.

Figure 7:
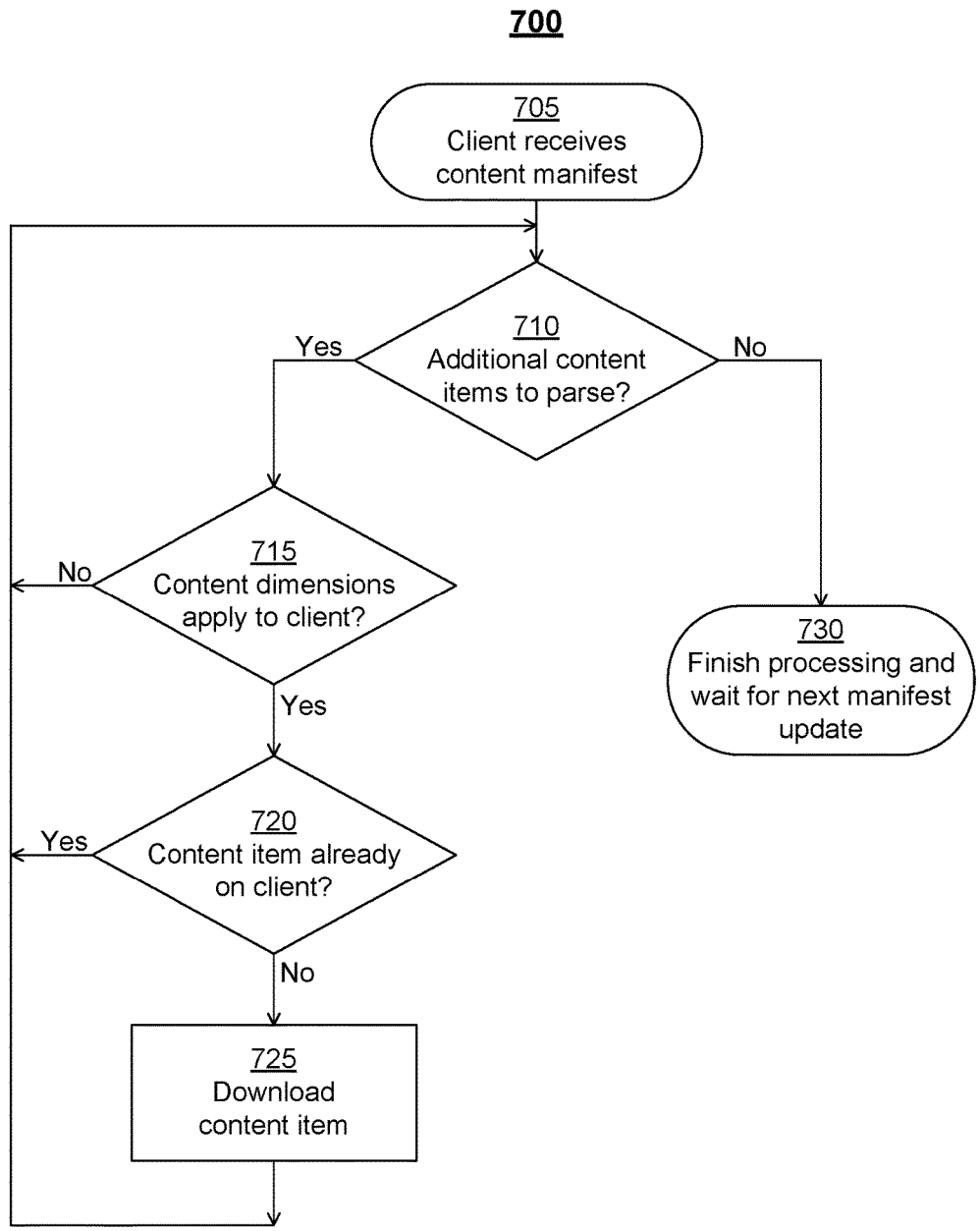
FIG. 7 illustrates an example method for parsing a content manifest received by a client device.

FIG. 7 illustrates an example method 700 for parsing a content manifest received by a client device 100. The method may begin at step 705 where client device 100 receives a content manifest. The client device 100 may receive the content manifest by downloading it from a URI of CDN 210, where the URI was provided to client device 100 by CMS 110 as described above and illustrated in FIG. 6. The client device 100 may parse the downloaded content manifest and begin to download content items listed in the manifest.

At step 710, the client device 100 determines whether there are additional content items in the content manifest to parse. If there are additional content items to parse, the method may proceed to step 715 where the client device 100 determines whether the content dimensions apply to the client device 100. A client device 100 determining whether a content dimension or content item applies to the client device 100 may be referred to as a client-side determination of whether a content dimension or content item applies to or is compatible with the client device. The client device may inspect the dimensions in the content manifest for the content item being parsed to determine whether the dimensions are applicable to or compatible with the device dimensions of client device 100. If the dimensions are not applicable to or not compatible with the device dimensions of client device 100, then the method may disregard the current content item and proceed back to step 710. Otherwise, if the dimensions are applicable to or compatible with the device dimensions, then the method may proceed to step 720. As an example and not by way of limitation, a first content item in a content manifest may include the dimension "model=GALAXY S6," and a second content item in the content manifest may include the dimension "model=GALAXY S7." A GALAXY S6 client device 100 may determine that the first content item applies to the device while the second content item is not applicable to the device. A GALAXY S7 client device 100 may determine that the first content item is not applicable to the device while the second content item is applicable to the device.

At step 720, the client device 100 may determine whether a content item is already on the client device 100. As an example and not by way of limitation, the client device 100 may compare a timestamp of a content item to a time stamp for a corresponding content item that the client device 100 has previously downloaded. As another example and not by way of limitation, the client device 100 may compare a hash value for the current content item being parsed (e.g., the hash value listed in the content manifest) to hash values for content items that the client device 100 has previously downloaded. If there is a match between the hash values, then the client device 100 already has a copy of the current content item being parsed, and the method may disregard the current content item and proceed back to step 710. Otherwise, if there is not a match between hash values, then the client device 100 does not have a copy of that content item, and the method may proceed to step 725.

At step 725, the client device 100 downloads the content item. The client device 100 may download the content item from a URI of the CDN 210, where the URI is listed in the content manifest, and then the method may proceed back to step 710. At step 710, if the client device 100 determines that there are no additional content items in the content manifest to parse, the method may proceed to step 730. At step 730, the client device 100 may finish processing any downloaded content items and wait for a subsequent manifest update, at which point the method may end. As an example and not by way of limitation, a client device 100 may periodically check with CMS 110 to determine whether a content manifest for the client device 100 has been updated. If there has been an update to a content manifest, the client device 100 may send a request to CMS 110 for the updated content manifest.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for parsing a content manifest including the particular steps of the method of FIG. 7, this disclosure contemplates any suitable method for parsing a content manifest including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

In particular embodiments, one or more methods as described herein may allow a number of content managers (e.g., CMS users 202) to distribute content to a large number of client devices 100 based at least in part on a variety of distribution dimensions. Additionally, the content-management activity (e.g., as handled by CMS 110) may be substantially decoupled from the content-distribution activity (e.g., as handled by CDN 210) through one or more levels of abstraction provided by the content items, content profiles, or content manifests. The CMS users 202 may manage content items, dimensions, and content profiles through CMS 110, and the delivery of content items to client devices 100 may be substantially managed by CDN 210 through content manifests generated by CMS 110. A client device 100 may interact with a CMS 110 to receive a content manifest, and the client device may then download the appropriate content items from CDN 210. In particular embodiments, one or more methods as described herein may allow both a CMS 110 and a client device 100 to determine what content should be distributed to the client device 100 and how or whether the content should be used by the client device 100. CMS 110 may provide both server-side and client-side determination of whether a particular content item applies to a particular client device. As an example and not by way of limitation, CMS 110 may receive a new content item and determine one or more content-item dimensions associated with the new content item. The content-item dimensions may be used by CMS 110 to perform a server-side determination of whether the new content item applies to or is compatible with a particular client device 100. Additionally, the particular client device 100 may perform a client-side determination of whether the content item applies to or is compatible with the client device 100.

Figure 8:
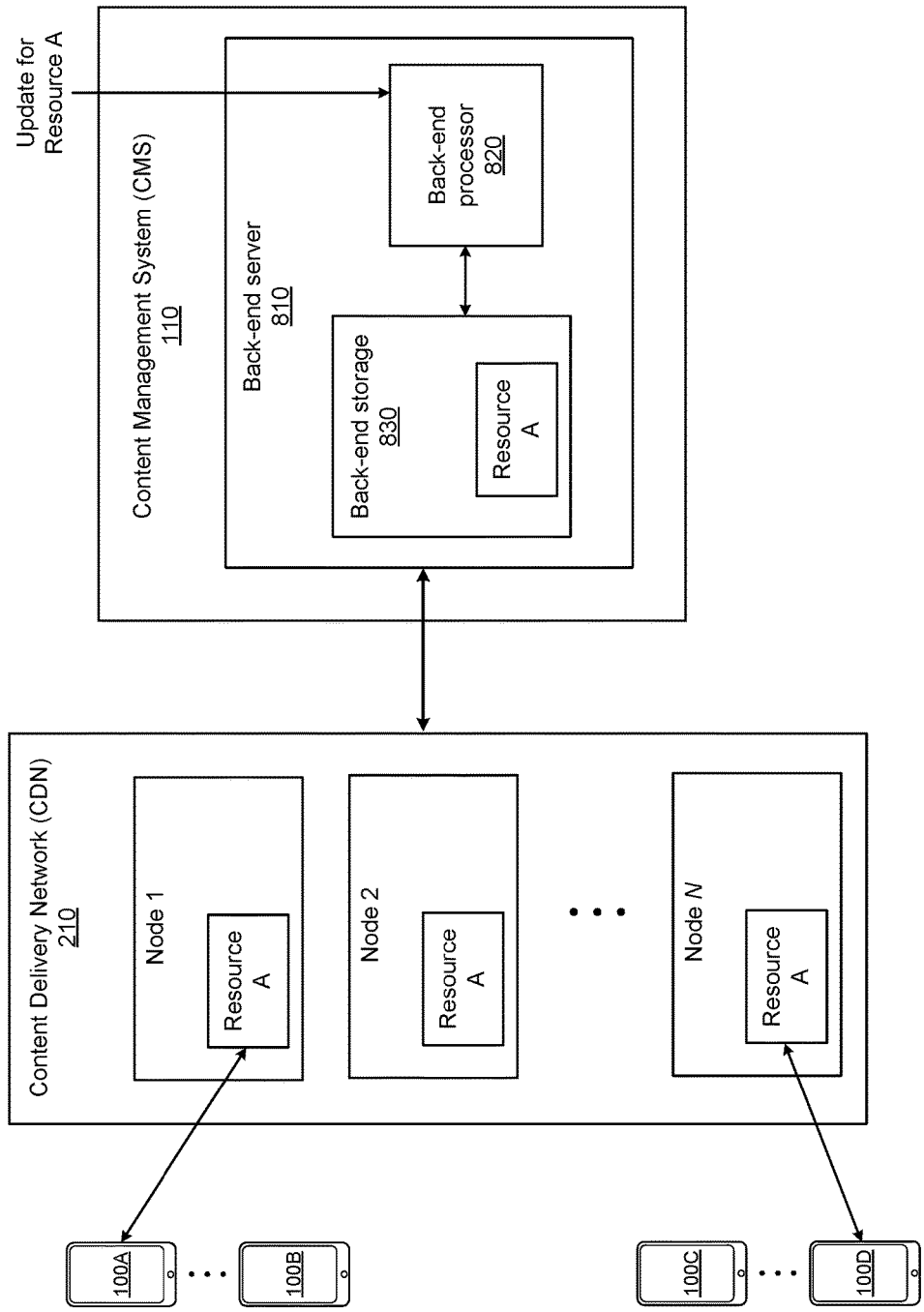
FIG. 8 illustrates an example content delivery network (CDN) configured to communicate with client devices and a back-end server of a content management system (CMS).

FIG. 8 illustrates an example content delivery network (CDN) 210 configured to communicate with client devices 100A-100D and a back-end server 810 of a content management system (CMS) 110. In particular embodiments, back-end server 810 of CMS 110 may receive a new client-resource file, a status update, or data that may necessitate an update to a client device or to an existing client-resource file. As used herein, a client-resource file may refer to a content item, content profile, content manifest, or any other suitable data or communication (e.g., a command, signal, notification, or status update). In particular embodiments, a client-resource file, which may be referred to as a resource file or a resource, may be a content item, a content profile, a content manifest, or any other suitable data or communication. As an example and not by way of limitation, a CMS user 202 may interact with CMS 110 to upload one or more new or updated content items. In particular embodiments, a new or updated resource file may be received by a back-end processor 820 of server 810, and the back-end processor 820 may analyze the uploaded resource file and automatically determine one or more dimensions for the resource. As an example and not by way of limitation, Resource A may be a new or updated video content item, and back-end processor 820 may analyze the uploaded video to determine that it is encoded using H.264 encoding and that a client device 100 may require a H.264 codec to playback the video.

In particular embodiments, back-end processor 820 may send a resource file to back-end storage 830 for storage, and back-end processor 820 or back-end storage 830 may send the resource file to CDN 210. As an example and not by way of limitation, back-end processor 820 may generate a new or updated content manifest and send the content manifest to back-end storage 830, and back-end server 810 may send the content manifest to CDN 210 by a server push. As another example and not by way of limitation, CDN 210 may obtain a new or updated client-resource file from back-end server 810 by a pull operation. Although this disclosure describes and illustrates particular CDNs configured to send or receive particular client-resource files, this disclosure contemplates any suitable CDNs configured to send or receive any suitable client-resource files.

In particular embodiments, CDN 210 may include multiple server nodes (e.g., Node 1 through Node N as illustrated in FIG. 8), where each server node may include one or more servers configured to distribute resource files to client devices. A CDN 210 may include any suitable number of server nodes (e.g., approximately 100, 1,000, or 10,000 server nodes) which may be located in a particular region (e.g., Europe, China, or the western United States) or may be distributed worldwide. As illustrated in FIG. 8, client device 100A may download Resource A from Node 1 of CDN 210, and client device 100D may download Resource A from Node N of CDN 210. In particular embodiments, a resource file may be provided to a client device by a server node of CDN 210, where the server node is located near a location of the client device. A CMS 110 that manages resource files may be located a significant distance (e.g., greater than 1,000 km) from a client device, but the server node of CDN 210 that provides resource files to the client device may be located relatively near the client device. As an example and not by way of limitation, a server node that provides resource files to a client device may be located within 1 km, 10 km, 100 km, or within any suitable distance of the client device. As another example and not by way of limitation, each server node of a CDN 210 may provide resource files to approximately 1,000 client devices which are located within 100 km of the server node. In the example of FIG. 8, client devices 100A through 100B may obtain resource files from Node 1, and each of those client devices may be located within 10 km of Node 1. Similarly, client devices 100C through 100D may obtain resource files from Node N, and each of those client devices may be located within 20 km of Node N. Additionally, client devices 100C through 100D may be located greater than 50 km from Node 1 and Node 2. Although this disclosure describes and illustrates particular CDNs having particular numbers of server nodes that are located particular distances from client devices, this disclosure contemplates any suitable CDNs having any suitable numbers of server nodes that are located any suitable distances from client devices.

In particular embodiments, a client-resource file may be encrypted using a symmetric-key encryption scheme or a public-key encryption scheme. As an example and not by way of limitation, a client-resource file may be encrypted by back-end server 810 of CMS 110 and then sent to CDN 210 for distribution to client devices. Encrypting a client-resource file may prevent unauthorized access to the client-resource file. The resource file may be encrypted using a shared secret key that has previously been provided to approved client devices (e.g., during a registration process where a client device initially registers with CMS 110). A client device may download an encrypted client-resource file and apply the previously received secret key to decrypt the file. In particular embodiments, a CDN 210 may make client-resource files available through client-specific signed URLs which may only be known to registered or approved client devices. Providing resource files through signed URLs may prevent unauthorized devices from accessing the resource files.

In particular embodiments, CDN 210 may receive from CMS 110 a new or updated content item for storage or distribution by the CDN. In response to receiving the content item, CDN 210 may store the new content item in the CDN and generate a URI identifying a resource corresponding to new content item. The URI may correspond to a web location of the CDN 210 from which a client device may download the new content item. In particular embodiments, the CDN 210 may send to the CMS 110 a notification that includes the URI of the CDN 210 from which the new content item can be accessed.

In the example of FIG. 8, an update for Resource A is received by back-end processor 820 of back-end server 810. In particular embodiments, an update for a client-resource file may include an updated or new version of an existing content item, content profile, or content manifest. In response to receiving the update for Resource A, back-end processor 820 may generate a new or updated version of Resource A and send the new or updated version of Resource A to CDN 210. As an example and not by way of limitation, an action that results in an update for Resource A may include receiving a new content item which is intended to be listed in a particular content manifest (e.g., the particular content manifest corresponds to Resource A). The CMS 110 may send the new content item to the CDN 210 and receive from the CDN 210 a URI for the new content item. The CMS 110 may then update the particular content manifest to include the URI for the new content item and send the updated content manifest to the CDN 210 for distribution to client devices 100.

In particular embodiments, a server of CDN 210 may receive an updated client-resource file. In the example of FIG. 8, CDN 210 receives a new or updated version of Resource A from CMS 110, and CDN 210 may copy Resource A to each node of CDN 210. In particular embodiments, an updated client-resource file received by CDN 210 may be an updated version of a current client-resource file identified by a particular URI of the CDN 210. As an example and not by way of limitation, an updated client-resource file may be a content manifest, such as for example a content manifest that is updated to reflect a new or revised content item that is listed in the content manifest. In particular embodiments, a content manifest may include a listing of one or more content-item identifiers, where each content-item identifier is a unique identifier that identifies a particular content item associated with the content manifest. In particular embodiments, a content manifest may include a listing of one or more URIs, where each URI is a resource of CDN 210 from which an associated content item can be downloaded. Each content item associated with the content manifest may be stored on CDN 210 where it may be accessed by multiple client devices 100.

Figure 11:
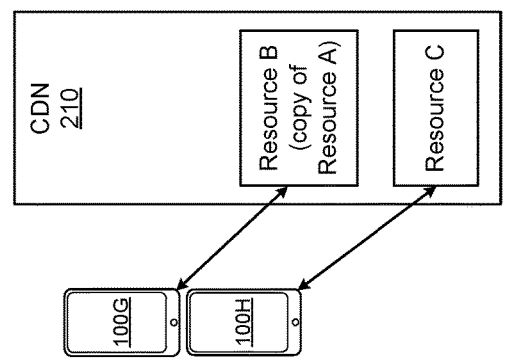
FIGS. 9-11 illustrate example resources being delivered to client devices by a CDN.
Figure 10:
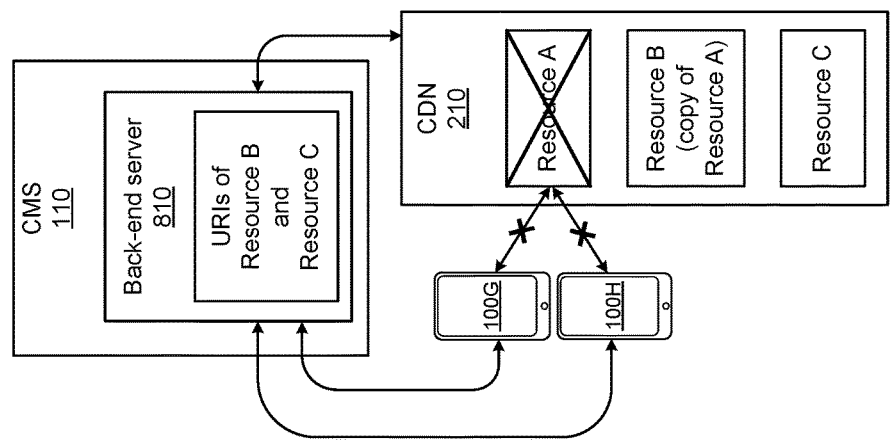
Figure 9:
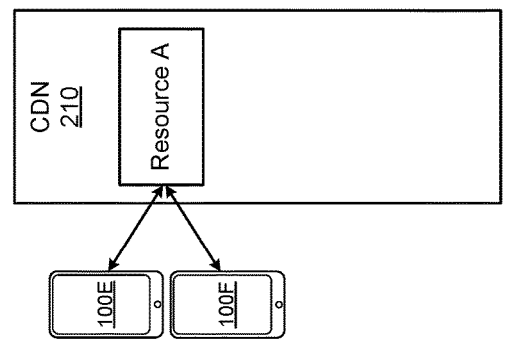

FIGS. 9-11 illustrate example resources being delivered to client devices by a CDN 210. In particular embodiments, CDN 210 may receive a request from a client device to access a URI of the CDN 210, where the URI corresponds to a web location of the CDN 210 that includes a client-resource file. In response to receiving the request, CDN 210 may provide the client-resource file to the requesting client device. In the example of FIG. 9, client devices 100E and 100F may each connect to CDN 210 to download a copy of Resource A, which may be a content item or a content manifest. Client devices 100E and 100F may have the same or similar device dimensions and may both be configured to download content items based on the same content manifest. In particular embodiments, client devices 100E and 100F may each have previously performed a registration process with CMS 110 during which they provided their respective device dimensions to CMS 110 and received a URI from CMS 110. The received URI may be a URI of CDN 210, which may be referred to as a resource of CDN 210, where the URI includes a content manifest that client devices 100E and 100F can download.

In particular embodiments, a subsequent time when a client device should send a subsequent request associated with a client-resource file may be provided to the client device. As an example and not by way of limitation, a client device may periodically poll a particular URI of the CDN 210 to check on whether the status of a particular client-resource file has changed. At the next polling interval, the client device may check on whether a content manifest located at a particular URI of CDN 210 has been updated. If the content manifest has been updated, the client device may download the updated content manifest. In particular embodiments, a client device may be provided with a subsequent time or with a polling interval at which the client device should poll the CDN 210 for any status updates. As an example and not by way of limitation, when a client device connects to the back-end server 810 to receive a URI of CDN 210, in addition to providing the URI, the back-end server 810 may also provide the client device with a time or a polling interval that tells the client device how often to monitor or poll the URI. As another example and not by way of limitation, polling information may be encoded in a client-resource file located on the CDN 210, and each time a client device checks the status of the client-resource file, the client device may also be instructed at what time or polling interval the client device should next check the status. The client device may receive instructions to connect to CDN 210 to check the update status of a client-resource file at any suitable time (e.g., at 3:00 AM, at 6:00 PM, or at midnight every day) or at any suitable polling interval (e.g., every 4 hours, once per day, or once per week).

In particular embodiments, CDN 210 may receive from CMS 110 an updated client-resource file, where the updated client-resource file is an updated version of a current client-resource file identified by a particular URI of the CDN 210. In particular embodiments, a client-resource file located at a particular URI of the CDN 210 may be referred to as being identified by or associated with the particular URI of the CDN 210. In the example of FIG. 9, a current version of Resource A may be stored on CDN 210 and associated with a particular URI of the CDN 210. The URI of the CDN may correspond to a web location of the CDN 210 that initially includes the current version of Resource A. In particular embodiments, CDN 210 may receive an updated version of Resource A, and in response to receiving an updated version of Resource A, CDN 210 may replace the current version of Resource A with the updated version of Resource A. As an example and not by way of limitation, CDN 210 may delete the current version of Resource A and copy the updated version of Resource A to the same URI that was previously associated with the current version of Resource A. In particular embodiments, CDN 210 may receive a request from a client device to access a URI that corresponds to a current version of a client-resource file. In response to the request, CDN 210 may provide to the client device an updated client-resource file. In the example of FIG. 9, CDN 210 may receive a request from client device 100E to access a URI associated with the current version of Resource A, and in response to the request, CDN may provide to client device 100E the updated version of Resource A.

In particular embodiments, an updated version of a content item or an updated version of a content manifest may be identified by or associated with a new URI of CDN 210. As an example and not by way of limitation, in response to receiving an updated version of a resource, rather than moving or deleting a current version of the resource from its current URI of CDN 210 or rather than replacing the current resource with the updated resource, CMS 110 may send the updated resource to a new URI of CDN 210 for storage and distribution from the new URI. In particular embodiments, CMS 110 may refrain from updating resources in the CDN 210 which may avoid potential problems with cache invalidation or inconsistency between nodes. As an example and not by way of limitation, CMS 110 may write or send an updated version of a resource to a new URI of CDN 210 rather than copying the updated resource to the same URI that was previously associated with the current version of the resource. In particular embodiments, a new URI for an updated resource may be included in a new or updated manifest, which may be sent to client devices 100 via push notifications. In particular embodiments, a timely delivery of updated content to client devices 100 may be provided, at least in part, by writing new or updated resources to new URIs (which may provide for avoidance or reduction of delays due to CDN cache expiration) and by notifying client devices 100 of updates through push notifications. In particular embodiments, when a request is received to identify an appropriate manifest URI based on a set of identified profiles (whether triggered by a push notification resulting from publishing a new version of a profile or triggered by an initial device registration), CMS 110 may hash the profile IDs to create a unique key that identifies a manifest. With such an approach, a change in underlying content or dimensions of a content profile results in a change in the associated hash of the content profile. Additionally, since a manifest will not be updated to have different content, there may be no need to block or lock other processes from overwriting the same new resource file since any process that overwrites a resource will overwrite it with the same content.

In particular embodiments, a change in a status of a client-resource file may serve as a notification to a client device that the client-resource file has been updated. As an example and not by way of limitation, a status change to a client-resource file that indicates the client-resource file has been updated may include an update to an identifier, an update to a client-resource hash value, or a timestamp with an updated time or date. In the example of FIG. 9, client devices 100E and 100F may periodically check the status of Resource A located at a particular URI of CDN 210 to determine if there are changes to Resource A that necessitate downloading a new or revised version of Resource A. A change in a status of Resource A may serve as a notification to the client devices to download a new or revised version of Resource A. In particular embodiments, an updated content manifest may include an updated identifier for the content manifest, an updated content-manifest hash value, or a timestamp with an updated time or date. As an example and not by way of limitation, a client device may inspect a timestamp for a content manifest, and based on determining that the timestamp is different from a timestamp of a previously downloaded content manifest, the client device may determine that the previous content manifest has been replaced with an updated content manifest. The client device may then download and parse the updated content manifest to identify any new or updated content items that should be downloaded. As another example and not by way of limitation, a client device may download a client-resource file, and based on determining that an identifier in the client-resource file has been changed, the client device may determine that the client-resource file is an updated version and may then parse the updated client-resource file. As another example and not by way of limitation, a client device may compare a hash value associated with a client-resource file stored on CDN 210 with a hash value for a previously downloaded version of the client-resource file. If the hash values are different, then the client device may determine that the client-resource file has been updated, and the client device may download the updated client-resource file from CDN 210.

In particular embodiments, a removal of a client-resource file may act as a notification to a client device to contact CMS 110 to retrieve a new or updated client-resource file. In the example of FIGS. 10-11, a removal of Resource A from CDN 210 acts as a notification to client devices 100G and 100H to contact CMS 110 to receive an updated URI corresponding to Resource A. In particular embodiments, CDN 210 may receive an instruction from CMS 110 to remove a current client-resource file, and in response to receiving the instruction, CDN 210 may remove or delete the current client-resource file from the CDN 210. Additionally, CMS 110 may upload or store a new client-resource file to a new URI of CDN 210, where the updated client-resource file is an updated version of the current client-resource file. In particular embodiments, CDN 210 may receive from CMS 110 an updated client-resource file, where the updated client-resource file is an updated version of a current client-resource file identified by a particular URI of the CDN 210. In response to receiving the updated client-resource file, CDN 210 may remove the current client-resource file from the particular URI of the CDN 210; store the updated client-resource file to a new URI of the CDN 210; and send a notification of the new URI to CMS 110. In FIG. 10, CDN 210 may receive Resource C from CMS 110, where Resource C is an updated version of Resource A. CMS 110 or CDN 210 may delete or remove Resource A from its URI of the CDN 210 and store Resource C to a new URI of the CDN. Additionally, CMS 110 or CDN 210 may store, move, or copy Resource A to a different URI of the CDN 210. In FIG. 10, Resource A has been renamed to Resource B and copied to a different URI. CDN 210 may then send to CMS 110 the new URIs corresponding to Resource B and Resource C.

In particular embodiments, in response to receiving a request from a client device to access a particular URI of CDN 210, the CDN 210 may send a failure notification to the client device indicating that the current client-resource file is not available at the particular URI. In particular embodiments, the CDN 210 may receive a subsequent request from the client device to access a new URI, and CDN 210 may provide to the client device an updated client-resource file from the new URI. In FIG. 10, CDN 210 receives a request from client device 100G to access Resource A, and in response to the request, client device 100G receives a failure notification that Resource A is no longer available (as indicated by the "X" drawn through Resource A). The failure notification acts to notify client device 100G that there has a been a change in the status of Resource A and client device 100G should connect to CMS 110 for an update. Client device 100G may then connect to back-end server 810 of CMS 110 to request a URI for an updated client-resource file corresponding to Resource A. Back-end server 810 of CMS 110 may provide a URI for Resource B, which is a copy of Resource A. In FIG. 11, CDN 210 receives a subsequent request from client device 100G to access a URI for Resource B, and in response, CDN 210 may provide Resource B to client device 100G. As an example and not by way of limitation, Resource A may be a content manifest, and Resource B may be the same content manifest having a different associated URI.

In particular embodiments, CMS 110 may connect to CDN 210 to remove, copy, or upload one or more client-resource files, or CMS 110 may instruct CDN 210 to remove, copy, or upload one or more client-resource files. As an example and not by way of limitation, CMS 110 may instruct CDN 210 to remove a current client-resource file from CDN 210, and CMS 110 may upload a new client-resource file to the CDN 210. Additionally, CMS 110 may copy the current client-resource file to a new URI of CDN 210. In particular embodiments, CDN 210 may receive an instruction from CMS 110 to copy a current client-resource file, and in response to receiving the instruction, CDN 210 may copy the current-client resource from a particular URI of CDN 210 to a first new URI of the CDN 210. In particular embodiments, CDN 210 may receive from CMS 110 an updated client-resource file, where the updated client-resource file is an updated version of a current client-resource file identified by a particular URI of the CDN 210. In response to receiving the updated client-resource file, CDN 210 may copy the current client-resource file from the particular URI to a first new URI of the CDN 210; remove the current client-resource file from the particular URI of the CDN 210; store the updated client-resource file to a second new URI of the CDN 210; and send a notification of the first and second new URIs to CMS 110. In FIG. 10, CMS 110 or CDN 210 may copy Resource A to a first new URI of the CDN 210 (and CMS 110 or CDN 210 may rename the file to Resource B), and CMS 110 or CDN 210 may remove Resource A from its original URI. Additionally, CMS 110 or CDN 210 may store Resource C (which may be an updated version of Resource A) to a second new URI of the CDN 210.

In particular embodiments, in response to receiving a request from a client device to access a particular URI, CDN 210 may send a failure notification to the client device indicating that the current client-resource file is not available at the particular URI. In particular embodiments, the CDN 210 may receive a subsequent request from the client device to access the second new URI, and the CDN 210 may provide to the client device the updated client-resource file from the second new URI. In FIG. 10, CDN 210 receives a request from client device 100H to access Resource A, and in response to the request, client device 100H receives a failure notification that Resource A is no longer available. The failure notification acts to notify client device 100H that there has a been a change in the status of Resource A and client device 100H should connect to CMS 110 for an update. Client device 100H may then connect to back-end server 810 of CMS 110 to request a URI for an updated client-resource file corresponding to Resource A. Back-end server 810 of CMS 110 may provide a URI for Resource C, which may be an updated or new client-resource file corresponding to Resource A. In FIG. 11, CDN 210 receives a subsequent request from client device 100H to access a URI for Resource C, and in response, CDN 210 may provide Resource C to client device 100G.

In particular embodiments, a group of client devices may be split into two or more separate groups which are instructed to monitor two or more different client-resource files. As an example and not by way of limitation, a group of GALAXY S6 and GALAXY S7 client devices may initially be configured to retrieve and monitor the status of a particular content manifest stored on CDN 210. The group may be split into two groups (e.g., one group of GALAXY S6 client devices and another group of GALAXY S7 devices) that monitor two different content manifests. In the example of FIGS. 10-11, client device 100G may be a GALAXY S6 device, and client device 100H may be a GALAXY S7 device. Initially, both devices may use and monitor Resource A, which may be a content manifest. When Resource A is removed from its associated URI, the client devices may be split into two groups so that client device 100G uses and monitors Resource B (which is a copy of Resource A), and client device 100H uses and monitors Resource C (which may be a new content manifest intended for use by GALAXY S7 client devices). In particular embodiments, a process of splitting a group of client devices as described above and as illustrated in FIGS. 10-11 may be applied to any suitable number of client devices. As an example and not by way of limitation, 50,000 devices that share the same content manifest may be split into one group of 40,000 devices that continue to use and monitor the same content manifest and another group of 10,000 devices that use and monitor a different manifest.

In particular embodiments, a CDN 210 as described and illustrated herein may allow any suitable number of client devices (e.g., from hundreds of client devices to billions of client devices) to be notified of a change to a client-resource file by a change in a status of a resource of the CDN 210. Such a system may be applied to advertising, mobile-device management (MDM), Internet of Things (IoT), or machine-to-machine (M2M) communications, where a significant number of client devices may share the same or similar device dimensions and may perform operations based on set of common content manifests. As an example and not by way of limitation, a collection of client devices may be installed in public locations or stores and may be configured to display certain advertising content to customers. One or more CMS users 202 may be able to centrally manage (through CMS 110) the content and status of client devices located around the world. In particular embodiments, a change in a status of a client-resource file may indicate that the client-resource file has been updated which may prompt a group of client devices to download or parse the updated version of the client-resource file. In particular embodiments, a removal of a client-resource file may prompt a group of client devices to contact CMS 110 to retrieve a new URI for a client-resource file. A system for maintaining and updating client-resource files may employ a CMS 110 that pushes any status updates to a CDN 210 and supplies to client devices links to appropriate resources of the CDN 210. Such a system may not require long-lived connections to client devices since the client devices may be configured to check for status updates at periodic intervals. Additionally, a back-end server 810 of a CMS 110 may be relatively lightweight since it may primarily push any status update to the CDN 210 and provide URIs to client devices, while the CDN 210 may handle distribution and most of the scalability with regards to the number of client devices.

FIG. 12 illustrates an example method 1200 for providing an updated client-resource file to a client device. The method may begin at step 1210, where a server of a CDN 210 may receive an updated client-resource file. The updated client-resource file may be an updated version of a current client-resource file identified by a particular URI of the CDN 210. In particular embodiments, the server may receive the updated client-resource file from a CMS 110. In particular embodiments, the CMS 110 or CDN 210 may copy the current client-resource file from the particular URI to a first new URI of the CDN 210; remove the current client-resource file from the particular URI of the CDN 210; store the updated client-resource file to a second new URI of the CDN 210; and send a notification that includes the first and second new URIs to the CMS 110. At step 1220, a request to access the particular URI may be received from a first client device 100. At step 1230, the updated client-resource file may be provided to the first client device 100, at which point the method may end. In particular embodiments, providing to the first client device the updated client-resource file may include: in response to receiving the request from the first client device to access the particular URI, sending a failure notification to the first client device indicating that the current client-resource file is not available at the particular URI; receiving a subsequent request from the first client device to access the second new URI; and providing to the first client device the updated client-resource file from the second new URI. Particular embodiments may repeat one or more steps of the method of FIG.

12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for providing an updated client-resource file to a client device including the particular steps of the method of FIG. 12, this disclosure contemplates any suitable method for providing an updated client-resource file to a client device including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
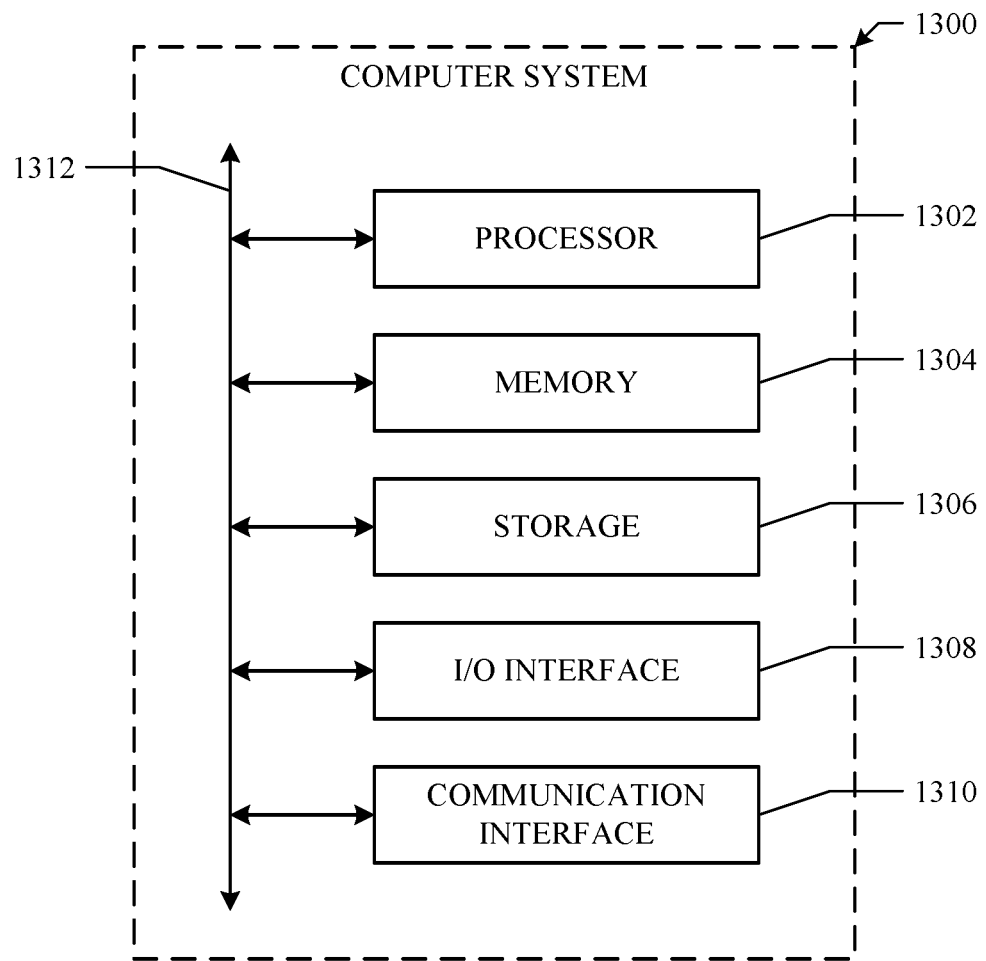
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate, and this RAM may be dynamic RAM (DRAM) or static RAM (SRAM), where appropriate. Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), body area network (BAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
receiving a request from a client device, the request comprising one or more device dimensions associated with the client device;
identifying a set of one or more content profiles, wherein each identified content profile is associated with one or more content-profile dimensions that are compatible with the received device dimensions;
determining whether a previously created content manifest corresponds to the identified set of content profiles, wherein the content manifest corresponds to a plurality of content profiles that apply to a plurality of devices, the plurality of devices comprising a first set of devices and a second set of devices that have at least one second-set device dimension that is different than the dimensions of the first set of devices;
in response to a determination that a previously created content manifest corresponds to the identified set of content profiles, sending to the client device an initial uniform resource identifier (URI) identifying a resource that includes the previously created content manifest;
receiving a new content profile having a content-profile dimension that corresponds to the at least one second-set device dimension that is different than the dimensions of the first set of devices;
creating a second-set content manifest corresponding to the plurality of content profiles and the new content profile;
sending the second-set content manifest to a content delivery network (CDN) for distribution by the CDN;
transmitting a request to the CDN to create a copy of the previously created content manifest;
receiving from the CDN a new URI corresponding to the copy of the previously created content manifest;
transmitting a request to the CDN to delete the previously created content manifest;
receiving from the CDN a second-set URI identifying a resource of the CDN that includes the second-set content manifest;
sending the second-set URI to one or more devices in the second set of devices;
receiving a request from a client device in the first set of devices for a content manifest, the request sent in response to a determination by the client device in the first set of devices that the initial URI no longer corresponds to any content manifest; and
sending to the client device in the first set of devices the new URI.

2. The method of claim 1, further comprising, in response to a determination that a previously created content manifest corresponding to the identified set of content profiles does not exist:
creating a new content manifest, the new content manifest corresponding to the identified set of content profiles;
sending the new content manifest to the CDN for distribution by the CDN;
receiving from the CDN a first URI identifying a resource of the CDN that includes the new content manifest; and
sending the first URI to the requesting client device.

3. The method of claim 1, wherein the device dimensions associated with the client device comprise one or more of a device model, a display size, a display resolution, a capability, a language, a geographic location, a store or company associated with the client device, or a file type or codec supported by the client device.

4. The method of claim 1, wherein the content-profile dimensions associated with a content profile comprise one or more of a language supported by the content profile, a geographic location where the content profile applies, an identification of a device dimension supported by the content profile, a file type or codec associated with the content profile, how a content item of the content profile is to be used, a time or date restriction for the content profile, or a store or company associated with the content profile.

5. The method of claim 1, wherein the content-profile dimensions being compatible with the received device dimensions comprises each device dimension of the one or more received device dimensions matching a corresponding content-profile dimension of the one or more content-profile dimensions.

6. The method of claim 1, wherein each content profile comprises one or more content-item identifiers, wherein each content-item identifier is a unique identifier that identifies a particular content item associated with the content profile.

7. The method of claim 6, wherein each content item comprises a document, file, application, image, video, audio file, computer-readable file, or command configured to be stored, displayed, operated, or played by the client device.

8. The method of claim 1, wherein each content manifest comprises one or more content-item identifiers, wherein each content-item identifier is a unique identifier that identifies a particular content item associated with that content manifest.

9. The method of claim 1, wherein the URI that identifies the resource that includes the previously created content manifest corresponds to a web location of the CDN that includes the previously created content manifest.

10. The method of claim 1, wherein determining whether the previously created content manifest corresponds to the identified set of content profiles comprises:
generating a hash of content-profile identifiers associated with the set of content profiles;
comparing the generated hash to a content-manifest hash, wherein the content-manifest hash comprises a hash of content-profile identifiers associated with the content manifest; and
determining whether the generated hash matches the content-manifest hash.

11. The method of claim 1, further comprising:
receiving a new content item;

sending the new content item to the CDN, wherein the CDN is configured to provide the new content item to a plurality of client devices; and receiving from the CDN a first URI identifying a resource of the CDN configured to provide the new content item to the plurality of client devices.

12. The method of claim 1, further comprising:
receiving a new content item; and
determining one or more content-item dimensions associated with the new content item, wherein the content-item dimensions are used to perform a client-side or server-side determination of whether the new content item applies to a particular client device.

13. The method of claim 12, further comprising, by the particular client device, performing a client-side determination of whether the new content item applies to the particular client device.

14. The method of claim 1, further comprising:
receiving a second content profile and one or more content-profile dimensions associated with the second content profile, wherein the second content profile comprises one or more content-item identifiers, wherein each content-item identifier is a unique identifier that identifies a particular content item associated with the second content profile; and
generating a content-profile identifier that identifies the second content profile.

15. The method of claim 1, wherein the request to the CDN to create a copy of the previously created content manifest and the request to the CDN to delete the previously created content manifest comprise sending the second-set content manifest to the CDN.

16. One or more non-transitory computer-readable storage media embodying instructions that are operable when executed to:
receive a request from a client device, the request comprising one or more device dimensions associated with the client device;
identify a set of one or more content profiles, wherein each identified content profile is associated with one or more content-profile dimensions that are compatible with the received device dimensions;
determine whether a previously created content manifest corresponds to the identified set of content profiles, wherein the content manifest corresponds to a plurality of content profiles that apply to a plurality of devices, the plurality of devices comprising a first set of devices and a second set of devices that have at least one second-set device dimension that is different than the dimensions of the first set of devices;
in response to a determination that the previously created content manifest corresponds to the identified set of content profiles, send to the client device an initial uniform resource identifier (URI) identifying a resource that includes the previously created content manifest;
receive a new content profile having a content-profile dimension that corresponds to the at least one second-set device dimension that is different than the dimensions of the first set of devices;
create a second-set content manifest corresponding to the plurality of content profiles and the new content profile;
send the second-set content manifest to a content delivery network (CDN) for distribution by the CDN;
transmit a request to the CDN to create a copy of the previously created content manifest;
receive from the CDN a new URI corresponding to the copy of the previously created content manifest;
transmit a request to the CDN to delete the previously created content manifest;
receive from the CDN a second-set URI identifying a resource of the CDN that includes the second-set content manifest;
send the second-set URI to one or more devices in the second set of devices;
receive a request from a client device in the first set of devices for a content manifest, the request sent in response to a determination by the client device in the first set of devices that the initial URI no longer corresponds to any content manifest; and
send to the client device in the first set of devices the new URI.

17. The media of claim 16, wherein the instructions are further operable when executed to, in response to a determination that a previously created content manifest corresponding to the identified set of content profiles does not exist:
create a new content manifest, the new content manifest corresponding to the identified set of content profiles;
send the new content manifest to the CDN for distribution by the CDN;
receive from the CDN a first URI identifying a resource of the CDN that includes the new content manifest; and
send the first URI to the requesting client device.

18. An apparatus comprising:
one or more non-transitory computer-readable storage media embodying instructions; and
one or more processors coupled to the storage media and configured to execute the instructions to:
receive a request from a client device, the request comprising one or more device dimensions associated with the client device;
identify a set of one or more content profiles, wherein each identified content profile is associated with one or more content-profile dimensions that are compatible with the received device dimensions;
determine whether a previously created content manifest corresponds to the identified set of content profiles, wherein the content manifest corresponds to a plurality of content profiles that apply to a plurality of devices, the plurality of devices comprising a first set of devices and a second set of devices that have at least one second-set device dimension that is different than the dimensions of the first set of devices;
in response to a determination that the previously created content manifest corresponds to the identified set of content profiles, send to the client device an initial uniform resource identifier (URI) identifying a resource that includes the previously created content manifest;
receive a new content profile having a content-profile dimension that corresponds to the at least one second-set device dimension that is different than the dimensions of the first set of devices;
create a second-set content manifest corresponding to the plurality of content profiles and the new content profile;
send the second-set content manifest to a content delivery network (CDN) for distribution by the CDN;
transmit a request to the CDN to create a copy of the previously created content manifest;

receive from the CDN a new URI corresponding to the copy of the previously created content manifest;
transmit a request to the CDN to delete the previously created content manifest;
receive from the CDN a second-set URI identifying a resource of the CDN that includes the second-set content manifest;
send the second-set URI to one or more devices in the second set of devices;
receive a request from a client device in the first set of devices for a content manifest, the request sent in response to a determination by the client device in the first set of devices that the initial URI no longer corresponds to any content manifest; and
send to the client device in the first set of devices the new URI.

\* \* \* \* \*